(12) United States Patent
Mallet

(10) Patent No.: US 9,477,010 B2
(45) Date of Patent: Oct. 25, 2016

(54) SYSTEMS AND METHODS TO BUILD SEDIMENTARY ATTRIBUTES

(71) Applicant: PARADIGM SCIENCES LTD., Grand Cayman (KY)

(72) Inventor: Jean-Laurent Mallet, Luxembourg-Beggen (LU)

(73) Assignees: PARADIGM SCIENCES LTD., Grand Cayman (KY); Jean-Laurent Mallet, Luxembourg-Beggen (LU)

( * ) Notice: Subject to any disclaimer, the term of this patent is extended or adjusted under 35 U.S.C. 154(b) by 13 days.

(21) Appl. No.: 14/211,744

(22) Filed: Mar. 14, 2014

(65) Prior Publication Data
US 2014/0278106 A1 Sep. 18, 2014

Related U.S. Application Data

(60) Provisional application No. 61/790,010, filed on Mar. 15, 2013, provisional application No. 61/829,444, filed on May 31, 2013.

(51) Int. Cl.
*G01V 99/00* (2009.01)
(52) U.S. Cl.
CPC .................... *G01V 99/005* (2013.01)
(58) Field of Classification Search
CPC ............................ G01V 99/005
USPC .............................................. 702/2
See application file for complete search history.

(56) References Cited

U.S. PATENT DOCUMENTS

| 4,964,099 A | 10/1990 | Carron |
| 4,991,095 A | 2/1991 | Swanson |
| 5,465,323 A | 11/1995 | Mallet |

(Continued)

FOREIGN PATENT DOCUMENTS

| AU | 2002329615 | 7/2002 |
| CA | 2455810 | 7/2005 |

(Continued)

OTHER PUBLICATIONS

Wan Yang, S.J. Yang, and Chellie S. Teal (Sediments, Facies Tracts, and Variations in Sedimentation Rates of Holocene Platform Carbonate Sediments and Associated Deposits, Northern Belize—Implications for "Representative" Sedimentation Rates; Journal of Sedimentary Research, Vol. 74, No. 4, July, 2004, p. 498-512).*

(Continued)

*Primary Examiner* — Gregory J Toatley
*Assistant Examiner* — Yoshihisa Ishizuka
(74) *Attorney, Agent, or Firm* — Pearl Cohen Zedek Latzer Baratz LLP

(57) ABSTRACT

A method and system for computing and visualizing sedimentary attributes may include receiving, by a processor, paleo-geographic coordinates representing predicted approximate positions of particles of sediment deposited at a time period when a layer was originally formed. The processor may numerically compute or determine a sedimentation rate that varies laterally along the layer. The processor may determine a sedimentary attribute based on the lateral variation of the sedimentation rate along the layer with respect to the paleo-geographic coordinates. A monitor or display may display the sedimentary attribute of the layer in the present-day geological space.

16 Claims, 9 Drawing Sheets

(56) References Cited

U.S. PATENT DOCUMENTS

| | | | |
|---|---|---|---|
| 5,475,589 A | 12/1995 | Armitage | |
| 5,586,082 A | 12/1996 | Anderson et al. | |
| 5,594,807 A | 1/1997 | Liu | |
| 5,671,136 A | 9/1997 | Willhoit | |
| 5,844,799 A * | 12/1998 | Joseph et al. | 702/2 |
| 5,995,907 A | 11/1999 | Van Bemmel et al. | |
| 6,018,498 A | 1/2000 | Neff et al. | |
| 6,106,561 A | 8/2000 | Farmer | |
| 6,138,076 A | 10/2000 | Graf et al. | |
| 6,151,555 A | 11/2000 | Van Bemmel et al. | |
| 6,246,963 B1 * | 6/2001 | Cross et al. | 702/14 |
| 6,278,949 B1 | 8/2001 | Alam | |
| 6,353,577 B1 | 3/2002 | Orban et al. | |
| 6,597,995 B1 | 7/2003 | Cornu et al. | |
| 6,725,174 B2 | 4/2004 | Bouts et al. | |
| 6,771,800 B2 | 8/2004 | Keskes et al. | |
| 6,778,909 B1 | 8/2004 | Popovici et al. | |
| 6,791,900 B2 | 9/2004 | Gillard et al. | |
| 6,820,043 B2 | 11/2004 | Mallet et al. | |
| 6,847,737 B1 | 1/2005 | Kouri et al. | |
| 6,850,845 B2 | 2/2005 | Stark | |
| 6,889,142 B2 | 5/2005 | Schonewille | |
| 6,904,169 B2 | 6/2005 | Kalevo et al. | |
| 7,024,021 B2 | 4/2006 | Dunn et al. | |
| 7,089,166 B2 | 8/2006 | Malthe-Sorenssen et al. | |
| 7,126,340 B1 | 10/2006 | Ameen et al. | |
| 7,187,794 B2 | 3/2007 | Liang et al. | |
| 7,227,983 B1 | 6/2007 | Christian et al. | |
| 7,248,539 B2 | 7/2007 | Borgos et al. | |
| 7,280,918 B2 | 10/2007 | Williams | |
| 7,412,363 B2 | 8/2008 | Callegari | |
| 7,418,149 B2 | 8/2008 | Dinh et al. | |
| 7,446,765 B2 | 11/2008 | Dugge | |
| 7,480,205 B2 | 1/2009 | Wei et al. | |
| 7,523,024 B2 | 4/2009 | Endres et al. | |
| 7,561,992 B2 | 7/2009 | Leflon et al. | |
| 7,660,481 B2 | 2/2010 | Schaap et al. | |
| 7,711,532 B2 | 5/2010 | Dulac et al. | |
| 7,742,875 B2 | 6/2010 | Li et al. | |
| 7,744,534 B2 | 6/2010 | Chalana et al. | |
| 7,844,402 B2 | 11/2010 | Klein et al. | |
| 7,970,593 B2 | 6/2011 | Roggero et al. | |
| 8,010,294 B2 * | 8/2011 | Dorn et al. | 702/14 |
| 8,065,088 B2 * | 11/2011 | Dorn et al. | 702/14 |
| 8,150,663 B2 | 4/2012 | Mallet | |
| 8,274,859 B2 | 9/2012 | Maucec et al. | |
| 8,600,708 B1 | 12/2013 | Mallet et al. | |
| 8,711,140 B1 | 4/2014 | Mallet | |
| 8,743,115 B1 | 6/2014 | Mallet et al. | |
| 2001/0036294 A1 | 11/2001 | Keskes et al. | |
| 2002/0032550 A1 | 3/2002 | Ward et al. | |
| 2002/0099504 A1 * | 7/2002 | Cross et al. | 702/2 |
| 2003/0023383 A1 | 1/2003 | Stark et al. | |
| 2003/0216897 A1 | 11/2003 | Endres et al. | |
| 2004/0260476 A1 | 12/2004 | Borgos et al. | |
| 2004/0267454 A1 | 12/2004 | Granjeon | |
| 2005/0114831 A1 | 5/2005 | Callegari et al. | |
| 2005/0216197 A1 | 9/2005 | Zamora et al. | |
| 2005/0228623 A1 * | 10/2005 | Leflon et al. | 703/2 |
| 2006/0004522 A1 | 1/2006 | Cacas | |
| 2006/0122780 A1 | 6/2006 | Cohen et al. | |
| 2008/0021684 A1 * | 1/2008 | Dulac et al. | 703/9 |
| 2008/0232694 A1 | 9/2008 | Sulatycke | |
| 2008/0273421 A1 | 11/2008 | Koren et al. | |
| 2009/0122060 A1 | 5/2009 | Porat et al. | |
| 2009/0157322 A1 | 6/2009 | Levin | |
| 2009/0265152 A1 * | 10/2009 | Cacas et al. | 703/6 |
| 2010/0156920 A1 | 6/2010 | Shin et al. | |
| 2010/0223039 A1 * | 9/2010 | Maliassov | G01V 99/00 703/2 |
| 2010/0245347 A1 | 9/2010 | Dorn et al. | |
| 2011/0015910 A1 | 1/2011 | Ran et al. | |
| 2011/0054857 A1 | 3/2011 | Moguchaya | |
| 2011/0106507 A1 * | 5/2011 | Lepage | 703/2 |
| 2011/0115787 A1 | 5/2011 | Kadlec | |
| 2011/0264430 A1 * | 10/2011 | Tapscott et al. | 703/10 |
| 2012/0037379 A1 | 2/2012 | Hilliard et al. | |
| 2012/0072116 A1 * | 3/2012 | Dorn et al. | 702/14 |
| 2013/0204598 A1 | 8/2013 | Mallet | |
| 2013/0231903 A1 * | 9/2013 | Li et al. | 703/2 |
| 2013/0262052 A1 | 10/2013 | Mallet et al. | |
| 2013/0333483 A1 * | 12/2013 | Horoshenkov et al. | 73/861.25 |

FOREIGN PATENT DOCUMENTS

| | | |
|---|---|---|
| EP | 2317348 | 5/2011 |
| GB | 2444506 A | 6/2008 |
| GB | 2444167 B | 3/2011 |
| RU | 2145100 | 1/2000 |
| WO | WO 99/41676 | 8/1999 |
| WO | WO 03/009003 A1 | 1/2003 |
| WO | WO 03/050766 | 6/2003 |
| WO | WO 2006/007466 A2 | 1/2006 |
| WO | WO 2008/005690 | 1/2008 |
| WO | WO 2013/015764 | 1/2013 |

OTHER PUBLICATIONS

Jean-Laurent Mallet (Space—Time Mathematical Framework for Sedimentary Geology, Jan. 2004).*
Edelstein-Keshet, Leah., Integral Calculus:Mathematics 103, University of British Columbia, Jan. 2, 2010.*
Muttalib, K.A., PHZ3113 Notes, Scalar Fields, Nov. 5, 2007.*
Field, James., Some Advantages of the Logarithmic Scale in Statistical Diagrams., Journal of Political Economy, vol. 25, No. 8, Oct. 1917, pp. 805-841.*
Wikipedia, Coordinate System, Jan. 20, 2012.*
U.S. Appl. No. 14/059,099, filed Oct. 21, 2013, Mallet et al.
U.S. Appl. No. 14/065,713, filed Oct. 29, 2013, Mallet et al.
U.S. Appl. No. 14/189,505, filed Feb. 25, 2014, Mallet.
U.S. Appl. No. 13/862,680, filed Apr. 15, 2013, Tertois, et al.
U.S. Appl. No. 14/260,760, filed Apr. 24, 2014, Mallet, et al.
U.S. Appl. No. 61/896,760, filed Oct. 29, 2013, Dulac, et al.
U.S. Appl. No. 14/485,018, filed Sep. 12, 2014, Hugot, et al.
Bakker, "Image Structure Analysis for Seismic Interpretation," doctoral thesis, publicly defended on Jun. 4, 2002.
Carr et al., "Reconstruction and Representation of 3D Objects with Radial Basis Functions," ACM SIGGRAPH 2001, ACM Press New York, Computer Graphics Proceedings, pp. 67-76, 2001 (ISBN 1-58113-374-X).
Caumon et al. "Building and Editing a Sealed Geological Model," Mathematical Geology, vol. 36, No. 4, May 2004; pp. 405-424.
Caumon et al., "Elements for Stochastic Structural Perturbation of Stratigraphic Models," Proc. Petroleum Geostatistics, Sep. 10-14, 2007.
Chiles et al., "Modelling the Geometry of Geological Units and its Uncertainty in 3D From Structural Data: The Potential-Field Method," Orebody Modelling and Strategic Mine Planning, pp. 313-320, Nov. 22-24, 2004.
Cignoni et al., "Multiresolution Representation and Visualization of Volume Data," IEEE Transactions on Visualizations and Computer Graphics; 3(4), Oct.-Dec. 1997; pp. 352-369.
Claerbout, "Fundamentals of Geophysical Data Processing with Applications to Petroleum Prospecting," Blackwell Scientific Publications, 1985.
Clawson et al., "The Value of 3D Seismic Attributes for Illuminating Deep Water Deposits by Seismic Forward Modeling of the Brushy Canyon Formation," 2003 SEG Annual Meeting, Oct. 26-31, 2003, Dallas, Texas (only Abstract submitted).
Courrioux et al., "3D Volumetric modelling of Cadomian Terranes (Northern Brittany, France): an automatic method using Voronoi diagrams," Tectonophysics 331(1-2), Feb. 2001, pp. 181-196.
Cremeens et al., "On Chronostratigraphy, Pedostratigraphy, and Archaeological Context," Soil Science Society of America, 1995.
Cuisenaire, "Distance Transformations: Fas Algorithms and Applications to Medical Image Processing," Laboratoire de Telecommunications et Teledetection; Oct. 1999.

(56) References Cited

OTHER PUBLICATIONS

Davies, "Conditioning Poorly Sampled Gathers for Pre and Post Stack Analysis," Journal of Conference Abstracts, 2002, vol. 7, No. 2, pp. 142-143.
De Groot et al., "How to create and use 3D Wheeler transformed seismic volumes," SEG/New Orleans 2006 Annual Meeting, pp. 1038-1042.
Dorn, "Chapter 13, Interpreting 3-D Seismic Data," The Leading Edge, Sep. 1998, p. 1261-1272.
Dulac, "Advances in chrono-stratigraphic interpretation modeling," First Break, vol. 27, Oct. 2009.
Durand-Riard et al., "Balanced restoration of geological volumes with relaxed meshing constraints," Computers and Geosciences, vol. 36, No. 4, pp. 441-452, Nov. 17, 2010.
EAGE Daily News, "Paradigm is Redefining Interpretation," 2011 EAGE Conference & Exhibition, May 2011.
Egan et al., "Three-Dimensional Modelling and Visualisation in Structural Geology: New Techniques for the Restoration and Balancing of Volumes," Proceedings of GIG Conference on Geological Visualisation—the Intelligent Picture?, British Geological Survey, Oct. 1996.
Escalona et al., Sequence-stratigraphic analysis of Eocene clastic foreland basin deposits in central Lake Maracaibo using high-resolution well correlation and 3-D seismic data, AAPG Bulletin, vol. 90, No. 4, pp. 581-623 (Apr. 2006) (only Abstract submitted).
Frank et al., "3D-reconstruction of Complex Geological Interfaces from Irregularly Distributed and Noisy Point Data," Computers & Geosciences 33 (2007) 932-943.
Frank, "Advanced Visualization and Modeling of Tetrahedral Meshes," Doctorat de l'Institut National Poly technique de Lorraine; pp. 1-140; 2006.
"Geomodeling Releases VisualVoxAT™ 6.2 Software—Introducing the Geobody Paintbrush," New Release, Sep. 24, 2007, printed from http://www.geomodeling.com/news_22.htm; on Oct. 5, 2009.
Gibbons, "Seismic Applications Overview," Society of Petroleum Engineers, Aug. 2003, 9 pages.
GoCAD Suite 2.5 2007 User Guide: Parts 1-12, published Sep. 15, 2007.
Harris et al., "Fault Seal Risk Volumes—A New Tool for the Assessment of Reservoir Compartmentalisation" 71st EAGE Conference & Exhibition—Amsterdam, The Netherlands, Jun. 8-11, 2009.
Jayr et al., "The Need for a Correct Geological Modelling Support: the Advent of the UVT-Transform," First Break, vol. 26, Oct. 2008, pp. 73-79.
Jentzsch et al., "Kinematic subsidence modelling of the Lower Rhine Basin," Netherlands Journal of Geosciences, vol. 81, No. 2, pp. 231-239 (2002).
Jones, "Data structures for three-dimensional spatial information systems in geology," Int. J. Geographical Information Systems, 3(1), 1989, pp. 15-30.
Labrunye et al., "New 3D flattened space for seismic interpretation," SEG Houston 2009 International Exposition and Annual Meeting, pp. 1132-1136.
Ledez, "Modelisation D'Objets Naturals par Formulation Implicite," Ecole Nationale Superieure de Geologie; Oct. 28, 2003; pp. 1-158, see English Abstract.
Lee et al., "Pitfalls in Seismic Data Flattening," The Leading Edge, Feb. 2001, pp. 161-164.
Lepage, "Generation de Maillages Tridimensionnels Pour la Simulation des Phenomenes Physiques en Geosciences," Ecole National Superieure de Geologie; Oct. 28, 2003; pp. 1-224, see English Abstract.
Lessenger et al., "An Inverse Stratigraphic Simulation Model: Is stratigraphic Inversion Possible?" Energy Exploration & Exploitation, vol. 14, No. 6, pp. 627-637 (1996) (only Abstract submitted).
Ligtenberg et al., "Sequence Stratigraphic Interpretation in the Wheeler Transformed (Flattened) Seismic Domain," EAGE 68th Conference & Exhibition—Vienna, Austria, Jun. 12-15, 2006.
Liwanag, "Reservoir Characterisation, Introducing geological processes in reservoir models," GEO ExPro Oct. 2005, pp. 28-32.
Lixin, "Topological relations embodied in a generalized tri-prism (GTP) model for a 3D geoscience modeling system," Computers & Geosciences 30(4), May 2004, pp. 405-418.
Lomask et al., "Flattening Without Picking," Geophysics, vol. 71, No. 4, pp. P13-P20, Jul.-Aug. 2006.
Lomask et al., "Flattening Without Picking," Stanford Exploration Project, Report 112, Nov. 11, 2002, pp. 141-150.
Lomask et al., "Update on Flattening Without Picking," Stanford Exploration Project, Report 120, May 3, 2005, pp. 137-159.
Lomask, "Flattening 3-D Seismic Cubes Without Picking," Jan. 8, 2004.
Mallet, "Discrete Smooth Interpolation in Geometric Modelling," Journal of Computer Aided Design, 24(4), 1992, pp. 178-191.
Mallet, "Numerical Earth Models," 2008 Eage Publications, ISBN 978-90-73781-63-4, p. 147-157.
Mallet, "Space-time Mathematical Framework for Sedimentary Geology," Journal of Mathematical Geology, vol. 36, No. 1, Jan. 2004, pp. 1-32.
Mallet, Geomodeling (Book chapter); Chapter 6; Oxford University Press; cover and preface pages and pp. 244-315, 2002.
Mallet, *Geomodeling*, Oxford University Press, Sep. 22, 2004 (ISBN 0-19-514460.0).
Mitchum et al., "Seismic Stratigraphy and Global Changes of Sea Level, Part 6: Stratigraphic Interpretation of Seismic Reflection Patterns in Depositional Sequences," received Jan. 6, 1977, accepted Jun. 13, 1977, pp. 117-133.
Monsen et al., "Geological process controlled interpretation based on 3D Wheeler diagram generation," SEG/San Antonio 2007 Annual Meeting, pp. 885-889.
Moretti et al., "KINE3D: a New 3D Restoration Method Based on a Mixed Approach Linking Geometry and Geomechanics," Oil & Gas Science and Techonology, Rev. IFP, vol. 61 (2006), No. 2, pp. 277-289.
Moyen et al., "3D-Parameterization of the 3D Geological Space—The Geochron Model," 9th European Conference on the Mathematics of Oil Recovery, Geological Modelling I, Aug. 30, 2004.
Moyen, "Paramétrisation 3D de L'espace en Géologie Sédimentaire: Le Modèle Geochron Thèse," Doctorat de l'Institut National Polytechnique de Lorraine, Jun. 9, 2005 (original text in French and English translation).
Müller et al. "3D Restoration and mechanical properties," from structure.harvard.edu/projects/restoration, Harvard University Structural Geology and Earth Resources Group, 2005, accessed on Aug. 21, 2012.
O'Malley et al., "Towards Robust Structure-Based Enhancement and Horizon Picking in 3-D Seismic Data," Proceedings of the 2004 IEEE Computer Society Conference on Computer Vision and Pattern Recognition (CVPR '04), 2004, vol. 2, pp. 482-489.
OpendTect Workflows Documentation version 4.2, dGB Beheer B.V., dGB Earth Sciences, Copyright © 2002-2010.
Oyedele, "3-D High Resolution Seismic Imaging of Middle-Late Quaternary Depositional Systems, Southeast Green Canyon, Sigsbee Escarpment, Gulf of Mexico," Thesis presented to the Faculty of the Dept. of Geosciences at the University of Houston, Aug. 2005.
Paradigm™ SKUA™ 2009 User Guide: Part V Seismic Interpretation Modeling, Feb. 3, 2009.
Rouby et al., "3-D Restoration of Complexly Folded and Faulted Surfaces Using Multiple Unfolding Mechanisms," AAPG Bulletin, vol. 84, No. 6, pp. 805-829 (Jun. 2000).
Rumpf et al., "A Continuous Skeletonization Method Based on Level Sets," Joint Europgraphics—IEEE Symposium on Visualization, pp. 151-157 (2002).
Saito, "New Algorithms for Euclidean Distance Transformation of an n-Dimensional Digitized Picture with Applications," Pattern Recognition, 27(11) 1994; pp. 1551-1565.
Samson et al., "Quantifying the Impact of Structural Uncertainties on Gross-Rock Volume Estimates", SPE 1996, pp. 381-392.

(56) References Cited

OTHER PUBLICATIONS

Smith et al., "Susan—A New Approach to Low Level Image Processing," International Journal of Computer Vision, 1997, vol. 23, Iss. 1, pp. 45-78.
Souche, "Integration of fault models into unstructured grids and geo-chronological space," 24$^{th}$ GOCAD Meeting, Jun. 2004.
Stark, "Generation of a 3D seismic 'Wheeler Diagram' from a high resolution Age Volume," pp. 782-786, submitted to the 75th Annual SEG Convention, Nov. 6-11, 2005, Houston, TX.
Stark, "Relative Geologic Time (Age) Volumes—Relating Every Seismic Sample to a Geologically Reasonable Horizon," The Leading Edge, Sep. 2004, pp. 928-932.
Terraspark Geosciences, "Geoscience Interpretation Visualization Consortium (GIVC)," http://terraspark.com/GIVC.consort, accessed on May 11, 2006.
Tertois et al., "Editing faults within tetrahedral volume models in real time," In Jolley, S.J., Barr, D., Walsh, J.J. et al. (Eds), Structurally Complex Reservoirs, London, UK: Geological Society of London, Special Publications 2007; v. 292; p. 89-101 (doi: 10.1144/SP292.5).
Tertois et al., Real-time Tetrahedral Volume Editing Accounting for Discontinuities; Ninth International Conference on Computer Aided Design and Computer Graphics (CAD/CG 2005) 2005 IEEE; pp. 1-6).
Tertois, "Création et édition de modèles géologiques par Champs de potential: Application au modele GeoChron—Thèse," Institut National Polytechnique de Lorraine, Jun. 21, 2007.
Tertois, Preserving Geological Information During Real-Time Editing of Faults in Tetrahedral Models; Int. Assoc. for Mathematic Geology Xith International Congress Universite de Liege—Belgium; 2006; S14-24; pp. 1-4.
Thomsen et al., "Towards a balanced 3D Kinematic Model of a Faulted Domain—the Bergheim Open Pit Mine, Lower Rhine Basin," Netherlands Journal of Geoscience, vol. 81, No. 2, pp. 241-250 (2002).
Thore et al., Integration of Structural Uncertainties into Reservoir grids construction—70th EAGE Conference & Exhibition—Rome, Italy, Jun. 9-12, 2008.
Trudgill et al., "Integrating 3D Seismic Data with Structural Restorations to Elucidate the Evolution of a Stepped Counter-Regional Salt System, Eastern Louisiana Shelf, Northern Gulf of Mexico," pp. 165-176. (2004).
Wen et al., "Use of Border Regions for Improved Permeability Upscaling," Mathematical Geology, 35(5), Jul. 2003; pp. 521-547.
Wood et al., "Applying Sequence Stratigraphy and Seismic Stratal Slice Technology in the Gulf of Mexico," GASTIPS, Lang et al. (Eds.), Winter 2003, vol. 9, No. 1, pp. 10-21.
Zeng et al., High-frequency Sequence Stratigraphy from Seismic Sedimentology: Applied to Miocene, Vermilion Block 50, Tiget Shoal Area Offshoure Louisiana, AAPG Bulletin, Feb. 2004, vol. 88, No. 2, pp. 153-174 (only Abstract submitted).
Zeng et al., "Interpretive Advantages of 90 Degree-Phase Wavelets: Part 2—Seismic Applications, " Geophysics, SEG, vol. 70, No. 3, May 2005-Jun. 2005. pp. C-17-C-24.
Zeng et al., "Seismic Frequency Control on Carbonate Seismic Stratigraphy: A Case Study of the Kingdom Abo Sequence, West Texas," AAPG Bulletin, vol. 87, Issue No. 2, pp. 273-293 (2003) (only Abstract submitted).
Zeng et al., "Stratal Slicing of Miocene-Pliocene Sediments in Vermilion Block 50-Tiger Shoal Area, Offshore Louisiana," The Leading Edge, Offshore Technology Special Section, vol. 20, No. 4, Apr. 2001, pp. 408-418.
Zeng et al., "Stratal Slicing, Part I: Realistic 3-D Seismic Model," Geophysics, Seg, vol. 63, No. 2, Mar. 1998-Apr. 1998, pp. 502-513.
Zeng et al., "Stratal Slicing, Part II: Read 3-D Seismic Data," Geophysics, vol. 63, No. 2 (Mar.-Apr. 1998); pp. 514-522.
Zeng et al., "Three-D Seismic Facies Imaging by Stratal Slicing of Miocene-Pliocene Sediments in Vermilion Block 50-Tiger Shoal Area, Offshore Louisiana," Secondary Gas Recovery, AAPG 2000.
Zeng, "From Seismic Stratigraphy to Seismic Sedimentology: A Sensible Transition," GCAGS Transactions, vol. 51, pp. 413-420 (2001) (only Abstract submitted).
Zeng,"Stratal Slicing: Benefits and Challenges," The Leading Edge 29, 1040 (Sep. 2010).
Zeng et al., "Stratal Slicing and Seismic Facies Imaging," Bureau of Economic Geology, The University of Texas at Austin, 1998. (only Abstract submitted).
Notice of Allowance issued for U.S. Appl. No. 11/628,559, mailed on Dec. 24, 2009.
Office Action issued for U.S. Appl. No. 11/628,559, mailed on Jun. 24, 2009.
Notice of Allowance issued for U.S. Appl. No. 12/791,370, mailed on Jul. 22, 2013.
Office Action issued for U.S. Appl. No. 12/791,370, mailed on Nov. 26, 2012.
Office Action issue for U.S. Appl. No. 14/059,099, mailed on Jun. 16, 2014.
Notice of Allowance issued for U.S. Appl. No. 12/791,352 mailed Dec. 6, 2013.
Office Action issue for U.S. Appl. No. 12/791,483, mailed on Aug. 17, 2012.
Office Action issued for U.S. Appl. No. 12/909,981 mailed Aug. 19, 2013.
Notice of Allowance issued for U.S. Appl. No. 12/909,981 mailed Jan. 27, 2014.
International Search Report issued for PCT International Application No. PCT/IB2004/002030, issued on Jan. 25, 2005.
Office Action issue for U.S. Appl. No. 14/065,713, mailed on Jun. 19, 2014.
Office Action issue for U.S. Appl. No. 14/211,744, mailed on Jun. 3, 2014.
Office Action issue for U.S. Appl. No. 14/260,760, mailed on Jul. 9, 2014.

\* cited by examiner

SYSTEMS AND METHODS TO BUILD SEDIMENTARY ATTRIBUTES

CROSS-REFERENCE TO RELATED APPLICATIONS

This application claims benefit of U.S. Provisional Patent Application No. 61/790,010 filed on Mar. 15, 2013 and U.S. Provisional Patent Application No. 61/829,444 filed on May 31, 2013, both of which are incorporated herein by reference in their entirety.

FIELD OF THE INVENTION

The field of the invention relates to characterizing and modeling stratified terrains in the subsurface.

BACKGROUND OF THE INVENTION

Erosion and tectonic activity through geological-time may transform an initially uniform stratified terrain composed of a continuous stack of depositional surfaces, called horizons, into a faulted and folded terrain fractured by faults forming discontinuities across the originally continuous horizons. Accordingly, to model the structures at their predicted or simulated original time of deposition from data collected from the current subsurface structures (e.g., to "reverse time"), the model may simulate a reversal of such erosion and tectonic activity.

A particle of sediment observed today at geographical coordinates (x,y) and altitude or vertical component (z) may have been deposited at an original time of deposition or "geological-time" t(x,y,z) at paleo-geographical coordinates u(x,y,z) and v(x,y,z). Depositional coordinates (u,v,t) so defined may be different than the observed (present day's) geographic coordinates (x,y,z). The "GeoChron" model may provide systems and methods to calculate or predict the depositional (past) coordinates u(x,y,z), v(x,y,z) and t(x,y,z) of a particle of sediment in a subsurface structure from its observed (present day) coordinates (x,y,z) in the geological layers. The depositional coordinates (u,v,t) may be displayed to model a simulation of the subsurface structures as they are predicted to have appeared at their original time of deposition.

Depending on the paleo-environment prevailing at the geological time of deposition, particles of sediment may have been deposited according to different depositional styles (such as, for example, on-lap, off-lap, or proportional) which may have impacted the geometry of the layers.

For more than three decades, geologists and geophysicists in the water, mineral (e.g. mining) and energy (e.g. oil and gas) industries have modelled "attributes" to characterize the properties of sedimentary terrains in the subsurface. An attribute may be a function f(x,y,z) which, based on observed data, such as seismic data or well data, may be estimated at each location (x,y,z) or coordinate in the present-day subsurface. The functions may statistically correlate with rock types and properties of the terrains and the functions may be used to identify these properties in a current time or predict these properties at a time of original deposition. These properties may be related to two previously known families of attributes, seismic attributes and geometric attributes:

Seismic attributes may be defined based on the shape of an observed seismic signal reflected by geological structures in the subsurface. The observed seismic signal may be recorded by a seismograph when measuring ground movement. Frequently used seismic attributes may include, for example, "instantaneous amplitude," "instantaneous velocity," and "instantaneous acceleration." These attributes may be computed using first and second order derivatives of the observed seismic signal crossing the geologic layers.

Geometrical attributes may be defined based on the shape of geological horizons or surfaces bounding geological layers and may provide information about the curvatures and distances to faults. Frequently used geometrical attributes may include "Gaussian curvature," "mean curvature," and "main curvature." These attributes may be computed using first and second order derivatives of a parametric representation of the horizons bounding the geologic layers.

SUMMARY OF THE INVENTION

Embodiments of the invention provide a system and method for computing and modeling sedimentary attributes, which describe stratified terrains or layers of a geological subsurface.

Embodiments of the invention provide a new family of attributes that may be referred to as "sedimentary attributes." Sedimentary attributes may define the properties of the sedimentation process of particles during deposition. Sedimentary attributes may be determined or computed based on lateral variations of a "sedimentation rate." The sedimentation rate defines the rate at which particles of sediment at their location were deposited. The sedimentation rate is proportional to the thickness of sedimentary layers. For example, the higher the sedimentation rate, the faster particles of sediment were deposited, and the thicker the layer is at that location. Sedimentary attributes may include, for example, sedimentary expansion (e.g. FIG. 4), sedimentary potential (e.g. FIG. 5), sedimentary acceleration (e.g. FIG. 6), sedimentary expansion ratio, sedimentary horizontal divergence, sedimentary horizontal norm, IPG-line curvature, N-line curvature, and normal divergence. Sedimentary attributes may be deduced or computed from lateral variations of a "sedimentation rate," which is itself proportional to the thickness of geological layers. For example, the faster particles of sediment were deposited in geological-time, the thicker its region of the layer.

In practice, each of the sedimentary attributes may be computed based on a lateral variation in sedimentation rate. For example, sedimentary attributes, such as, sedimentary expansion and sedimentary acceleration, may be computed based on a lateral variation (e.g. first and second derivatives) of the sedimentation rate through a geological layer. However, in the current geological time, layers become folded and/or faulted (e.g. see folded layer 302 in the left image of FIG. 3A) and the "lateral" direction (e.g. 318a, tangential to the curvature of the layer or horizons bounding the layer) likewise becomes faulted and/or folded. Therefore, the "horizontal" (x,y) direction in a rectilinear (non-curvilinear) coordinate system (e.g. Cartesian coordinate system) do not reliably conform to the curvature of the layer, but may cross in and out of the layer as it curves along folds or breaks along faults. To reliably follow the lateral direction within a faulted or folded layer, a second curvilinear coordinate system (e.g. u,v,t) may be used, having paleo-geographical axes or "iso-t" surfaces that themselves curve (e.g. see FIG. 7). Iso-t surfaces have a constant ("iso") geological-time (t) and vary in paleo-geographic coordinates (u,v). Iso-t surfaces represent horizons and other layers, which curve tangentially to the folded and/or faulted layers when viewed in the original (non-curvilinear) coordinate system (e.g. curved iso-surface 318a in the left image of FIG. 3A). Accordingly, a "lateral" direction folowing a folded and/or faulted horizon may be modeled by iso-t surfaces (e.g. 318b) of the curvilinear coordinate system (e.g. 310). Therefore, the lateral change in sedimentation rate (V(x,y,z)) may be measured along the iso-surfaces with respect to infinitesimal changes in paleo-geographical coordinate (du and/or dv) of the curvilinear coordinate system (e.g. as dV/du and/or dV/dv).

Sedimentary attributes may also be defined based on a lateral variation in layer thickness. Embodiments of the invention may generate a measure of a thickness Δh of a layer, which due to lateral variations in the sedimentation rate, may vary laterally along the layer in a present day model. Variations or changes in the thickness of the layer may be best measured with respect to paleo-geographic coordinates that vary laterally along a depositional surface (also called by geologists an "horizon") inside the layer, e.g., with respect to (u,v) paleo-geographic coordinates. As shown for example in FIG. 7, paleo-geographic coordinates vary tangentially along the horizon or layer surfaces regardless of deformation or curvature in the layer. In contrast, when layers are curved or faulted, modeling the variation of layer thickness according to a (x,y) geographic coordinates may be less effective since the "lateral" or "horizontal" direction in the x-y plane may vary in depth e.g. within a horizon or even cross through several layers.

As shown, for example in FIG. 2, using the uvt-transform, sedimentary attributes may be displayed in either a present-day geological time model (e.g. in xyz-space) or a depositional model (e.g. uvt-space) visualizing the subsurface layer(s) at a geological time when the structure was originally deposited.

A three dimensional (3D) depositional model may be represented by for example functions t(x,y,z), u(x,y,z) and v(x,y,z) such that, for any location (x,y,z) in the subsurface:

t(x,y,z) represents the geological-time of original deposition of a point representing a particle of sediment observed today at location (x,y,z);

u(x,y,z) and v(x,y,z) represent the paleo-geographic coordinates at the geological-time of deposition t(x,y,z) of the point representing the particle of sediment observed today or in the present-day time at location (x,y,z).

Embodiment of the invention may compute the functions u(x,y,z), v(x,y,z) and t(x,y,z) that model a subsurface structure, such as one or more layers, or model attributes that are related to the structure. Note that these functions may be non-unique (e.g. there are multiple transformations from (x,y,z) coordinates to (u,v,t) coordinates), but may be considered equivalent when they represent the same equivalent geometry and deformation of the geological layers transformed to their positions as observed today.

In an embodiment of the invention, a computing system or processor may be used to generate and model sedimentary attributes. The present day coordinates (x,y,z) may be an "input" of the computing system. The present day coordinates (x,y,z) may be transformed into paleo-depositional coordinates u(x,y,z), v(x,y,z) and/or t(x,y,z), and may be used to generate a sedimentary rate V(x,y,z). The sedimentary attributes SA(x,y,z) may be computed based on the lateral variation of the sedimentary rate V(x,y,z) with respect to paleo-depositional coordinates u(x,y,z), and v(x,y,z). The "output" of the computing system may include the sedimentary attributes SA(x,y,z) modelled in the present-day coordinate system (x,y,z) (e.g. as shown in FIGS. 4-6) and/or mapped or transformed to the depositional coordinate system, for example, by functions SA(u,v,t)=SA(u(x,y,z), v(x,y,z), t(x,y,z)).

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
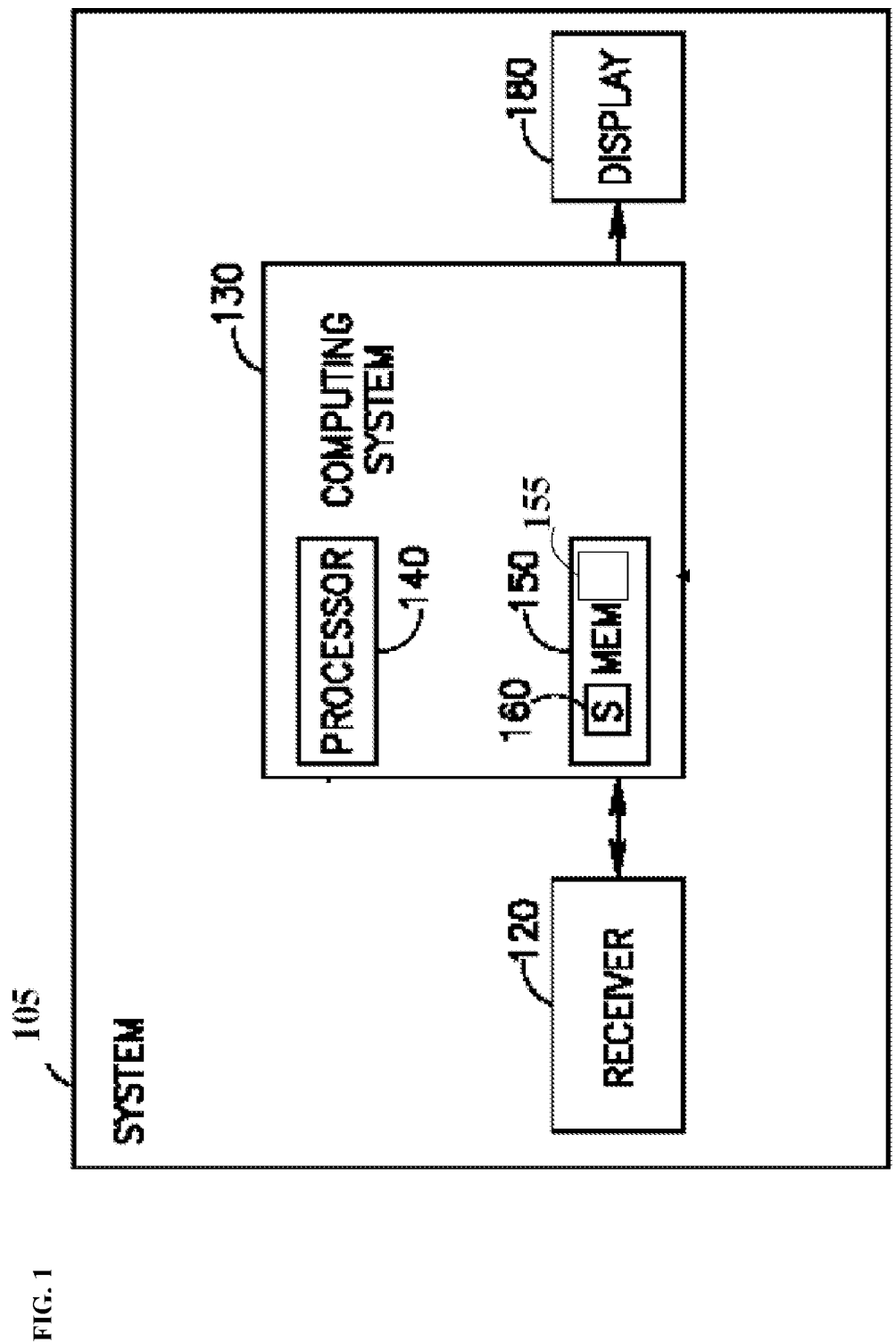
FIG. 1 is a diagram of a computer system, according to some embodiments of the invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The present description presents a preferred embodiment. The features of the invention are subject to alteration and modification and therefore the present description should not be considered limiting.

Geological layers may include particles of sediment which have been deposited throughout geological time at paleo-geographic locations. Sedimentary attributes may define or be used to determine parameters representing the sedimentation of particles over time. Sedimentary attributes may include, for example, sedimentary expansion (FIG. 4), sedimentary potential (FIG. 5), sedimentary acceleration (FIG. 6), sedimentary expansion ratio sedimentary horizontal divergence, sedimentary horizontal norm, curvature of an N-line (FIG. 3B), curvature of an IPG-line (FIG. 3B), and normal divergence. Numerical method and computer systems may be used to derive these attributes from a GeoChron model describing the paleo-geographic (Geo) coordinates (u,v) and geological-time (Chron) coordinate (t) of deposition of the particles of sediment observed today in the subsurface. The sedimentary attributes may be determined from seismic data and well data and may be correlated with different characteristics or physical properties (e.g., permeability, porosity, rock type) of the subsurface on a local level, accounting for changes in the properties across the subsurface. From a practical perspective, correlations between sedimentary attributes (e.g. Ricci curvature, sedimentary acceleration) and depositional style (e.g., sedimentation mode or style) may be used to better estimate the variations of physical properties in the subsurface (e.g., variations between horizons, faults, and layers). Geological facies of rock formations may strongly depend on sedimentary attributes including the energy of sedimentary fluxes and, in turn, physical properties of layers may strongly depend on these facies. As a consequence, sedimentary attributes may be linked to the physical properties of the terrains and may be used to guide the modeling of physical properties in the subsurface.

For the sake of clarity and for the purpose of simplifying the presentation of embodiments of the invention, the following preliminary definitions are given, although other definitions may be used:

Geological-Time

A particle of sediment in a geological terrain may be observed at a location in the subsurface. The location of the particle may be mathematically represented or modeled, e.g., by a vector, (x,y,z), in a three-dimensional (3D) space, such as the Cartesian coordinate system (of course, when modeling such particles, the position of many particles may be modeled together for example using a cell). When modeled, a data structure such as a node or cell may represent a subset of particles. The time when the particle of sediment was originally deposited may be referred to as the "geological-time" and may be represented or modeled, e.g., as a geological-time function of the current location of the particle, t(x,y,z). When used herein, a "current," "observed" or modern day location for a particle (or data structure representing one or more particles) or subsurface feature may mean the location of the item in the present day, relative to geological time. The actual geological-time of the deposition of particles may be difficult to determine and may be replaced, e.g., by any arbitrary monotonic increasing function of the actual geological-time. The monotonic function may be referred to as the "pseudo-geological-time". Geological-time and pseudo-geological-time are referred to interchangeably herein.

The geological-time function t(x,y,z) may be monotonic, e.g., the gradient of the geological-time never reduces to the null vector and the geological-time function has no local maximum or minimum values.

Level Set Surface

Consider a function f(x,y,z) defined in a 3D space in such a way that its gradient never reduces to the null vector. A level set surface, $S(f_0)$, may be the set of points where the function f(x,y,z) is equal to a given numerical value, $f_0$.

As an example, if the geological-time t(x,y,z) represents a pseudo-geological-time of deposition, then the level set surface $H(t_0)$ of t(x,y,z) may be a geological horizon.

Various mechanisms are currently used for modeling subsurface geological terrains:

GeoChron Model, G-Space and $\overline{G}$-Space

When a layer of particles was deposited during a geological-time period in the past, the layer typically had continuous geometry during that time period. However, after the passage of time, the layers may become eroded and disrupted by faults, for example, resulting from tectonic motion or other sub-surface movements, which result in uneven and discontinuous layers in the present day subsurface. As compared to the continuous layers geometry of the past, the discontinuous layers of the present are difficult to model. Accordingly, the "GeoChron" model has recently been developed to operate between two 3D spaces (e.g. G space 104 and $\overline{G}$ space 106 in FIG. 2). These two 3D spaces or models may be, for example:

A 3D space G, called the "Geological Space" or G-space, representing a model of the current subsurface features observed in modern times or today (e.g., current modeled locations of particles of sediment in the terrain). The modeled location of each particle (or of a subset of particles, or of cells estimating the location of numerous particles) may be represented by the coordinates (x,y,z), where (x,y) may describe the today geographical coordinates of the particle (e.g., latitude and longitude) and (z) may describe the today altitude or distance below or above a given reference surface level (e.g., the sea level); and A 3D space $\overline{G}$, called the "depositional-space" or "parametric-space" or more simply $\overline{G}$-space, representing modeled or predicted locations of particles of sediment at the time when the particles were originally deposited in the layer. The modeled location of each particle may be represented by the coordinates (u,v,t) where (t) may be the geological-time of deposition of the particle and (u,v) may be the paleo-geographical coordinates of the particle at geological-time (t).

The GeoChron model defines a transformation between the two 3D spaces G and $\overline{G}$. The transformation may be referred to as a "uvt-transformation," for example, transforming the (x,y,z) coordinated of the G space to the (u,v,t) coordinated of the $\overline{G}$ space. The GeoChron model applies a forward uvt-transformation to transform the current model (a model of the subsurface features current in time) in G-space to the original deposition model in $\overline{G}$-space and applies an inverse or reverse uvt-transformation to transform the original deposition model in $\overline{G}$-space to the current model in G-space. Accordingly, the GeoChron model may execute complex computations on the original deposition model in $\overline{G}$-space where geological properties are typically uniform and simple to manipulate relative to the discontinuous current model in G-space. Once the original deposition model in $\overline{G}$-space is sufficiently accurate, the GeoChron model may use the "reverse uvt-transformation" to transform the model, and its geological properties, back to the current time domain in G-space to generate the present day non-uniform geological properties of the faulted and eroded present day model.

Figure 7:
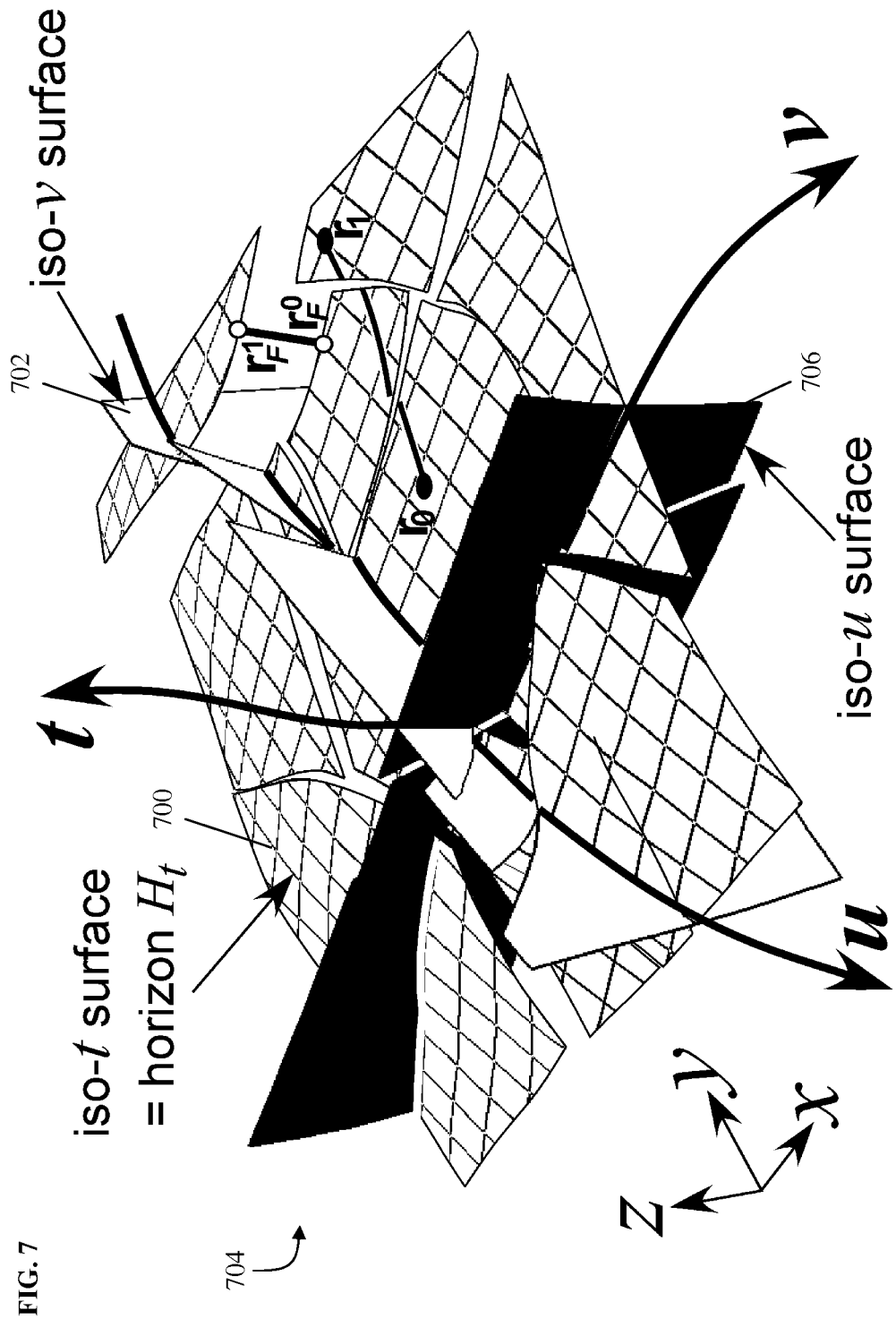
FIG. 7 is a schematic illustration of iso-surfaces of a curvilinear coordinate system, according to embodiments of the invention.

Embodiments of the invention may compute the functions u(x,y,z), v(x,y,z) and t(x,y,z) at each location (x,y,z) observed (e.g. measured or interpolated) today in the present-day subsurface model. From a practical perspective, the functions u(x,y,z), v(x,y,z) and t(x,y,z) may be deduced from seismic data (e.g., a seismic cube) and/or well data (e.g., well markers). The functions u(x,y,z) and v(x,y,z) are curvilinear (e.g. as shown in FIG. 7), and may be used, for example, to characterize curvilinear "lateral" surfaces (iso-t surface shown in in FIG. 7) to determine variations in a layer's thickness or sedimentation rate along the curvilinear iso-t surface.

Reference is made to FIG. 1, which schematically illustrates a system including receiver and computing system in accordance with an embodiment of the present invention. Methods disclosed herein may be performed using a system 105 of FIG. 1. In other embodiments, methods used herein may be performed by different systems, having different components.

System 105 may include a receiver 120, a computing system 130, and a monitor or display 180. The data mentioned herein, e.g., seismic data and well markers used to form intermediate data and finally to model subsurface regions and sedimentary attributes, may be ascertained by processing data received by receiver 120 (e.g., a hydrophone or microphone). Intermediate data and other data such as results, models, and visualizations, as well as code, instructions or software, may be stored in memory 150 or other storage units. The aforementioned processes described herein may be performed by software 160 (e.g., stored in memory 150 or other units) being executed by processor 140 manipulating the data.

Receiver 120 may accept data representing a geo-chronological model. The model may include a set of points that depict or represent an estimated or predicted state of the subsurface structure at a time period when the subsurface structure was originally formed. The data may be sent to a processor 140 to numerically compute sedimentary attributes of a subsurface. The sedimentary attributes may be, for example, a function, a vector field or a tensor field.

Computing system 130 may include, for example, any suitable processing system, computing system, computing device, processing device, computer, processor, or the like, and may be implemented using any suitable combination of hardware and/or software. Computing system 130 may include for example one or more computer controllers or processor(s) 140, memory 150 and software 160. Data 155 generated by reflected signals, received by receiver 120, may be transferred, for example, to computing system 130. The data may be stored in the receiver 120 as for example digital information and transferred to computing system 130 by uploading, copying or transmitting the digital information. Processor 140 may communicate with computing system 130 via wired or wireless command and execution signals.

Memory 150 may include cache memory, long term memory such as a hard drive, and/or external memory, for example, including random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Memory 150 may store instructions (e.g., software 160) and data 155 to execute embodiments of the aforementioned methods, steps and functionality (e.g., in long term memory, such as a hard drive). Data 155 may include, for example, a vector field describing a set of paleo-geographic points, instructions for processing the collected data to generate a model, or other instructions or data. Memory 150 may store a geological-time function, a model including a set of paleo-geographic coordinates representing a structure when it was originally deposited in the layer (e.g., in uvt-space), a model representing the corresponding structure in a current or present-day time period (e.g., in xyz-space), a model representing a function of one or more sedimentary attributes in the present-day or depositional space and/or a model of the physical properties (e.g., permeability, porosity, rock type) of the structures derived from the sedimentary attributes. Memory 150 may store cells, nodes, voxels, etc., associated with the model and the model mesh. Memory 150 may also store forward and/or reverse uvt-transformations to transform current models in xyz-space to models in uvt-space, and vice versa. Data 155 may also include intermediate data generated by these processes and data to be visualized, such as data representing graphical models to be displayed to a user. Memory 150 may store intermediate data. System 130 may include cache memory which may include data duplicating original values stored elsewhere or computed earlier, where the original data may be relatively more expensive to fetch (e.g., due to longer access time) or to compute, compared to the cost of reading the cache memory. Cache memory may include pages, memory lines, or other suitable structures. Additional or other suitable memory may be used.

Computing system 130 may include a computing module having machine-executable instructions. The instructions may include, for example, a data processing mechanism (including, for example, embodiments of methods described herein) and a modeling mechanism. These instructions may be used to cause processor 140 using associated software 160 modules programmed with the instructions to perform the operations described. Alternatively, the operations may be performed by specific hardware that may contain hard-wired logic for performing the operations, or by any combination of programmed computer components and custom hardware components. Processor 140 may be configured to carry out embodiments of the present invention by, for example, executing instructions or code. One or more processors 140 may be configured to carry out methods of the invention in different manners, for example by including specialized circuitry.

Embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

Processor 140 may perform various methods described herein. For example, processor 140 may generate a geological time function $t(x,y,z)$ according to techniques known in the art. The geological time function $t(x,y,z)$ may be an arbitrary monotonic increasing function of the actual geological-time.

Processor 140 may generate paleo-geographic coordinates $u(x,y,z)$ and $v(x,y,z)$ and geological-time $t(x,y,z)$ defining a horizon $H^*(t_0)$ in $\overline{G}$-space, which models a "past" or "paleo" state of the subsurface structures at a time when they were originally deposited in the layer. The paleo-geographic coordinates of the past depositional model are generated based on the geometry of the current modeled horizons.

Processor 140 may generate functions $\{u(x,y,z), v(x,y,z), t(x,y,z)\}$ between G-space and $\overline{G}$-space to transform a current model in G-space of a discontinuous faulted horizon to a single substantially continuous horizon in $\overline{G}$-space. The paleo-geographic coordinates $\{u(x,y,z), v(x,y,z)\}$ may be defined by a system of equations in $\overline{G}$-space. Processor 140 may determine sedimentary attributes of the functions $\{u(x,y,z), v(x,y,z), t(x,y,z)\}$ or $\{x(u,v,t), y(u,v,t), z(u,v,t)\}$ e.g. according to a deposition style. These attributes may include functions of sedimentation rate, for example, or other attributes based on sedimentation, such as, sedimentary expansion (FIG. 4), sedimentary potential (FIG. 5), sedimentary acceleration (FIG. 6).

Display 180 may display data from receiver 120, or computing system 130 or any other suitable systems, devices, or programs, for example, an imaging program or receiver tracking device. Display 180 may include one or more inputs or outputs for displaying data from multiple data sources or to multiple displays. For example display 180 may display visualizations of models including sedimentary attributes of subsurface structures and/or their subsurface features, such as faults, horizons and unconformities. Display 180 may display sedimentary attributes of horizon H(t₀) in G-space and/or sedimentary attributes of horizon H*(t₀) in G̅-space. Display 180 may display the models in separate pages or windows and a user may select one of the models (e.g., by clicking a 'G-space' or 'G̅-space' button with a pointing device such as a mouse or by scrolling between the models). A user may select a display option to show, hide or switch between different sedimentary attributes.

Figure 2:
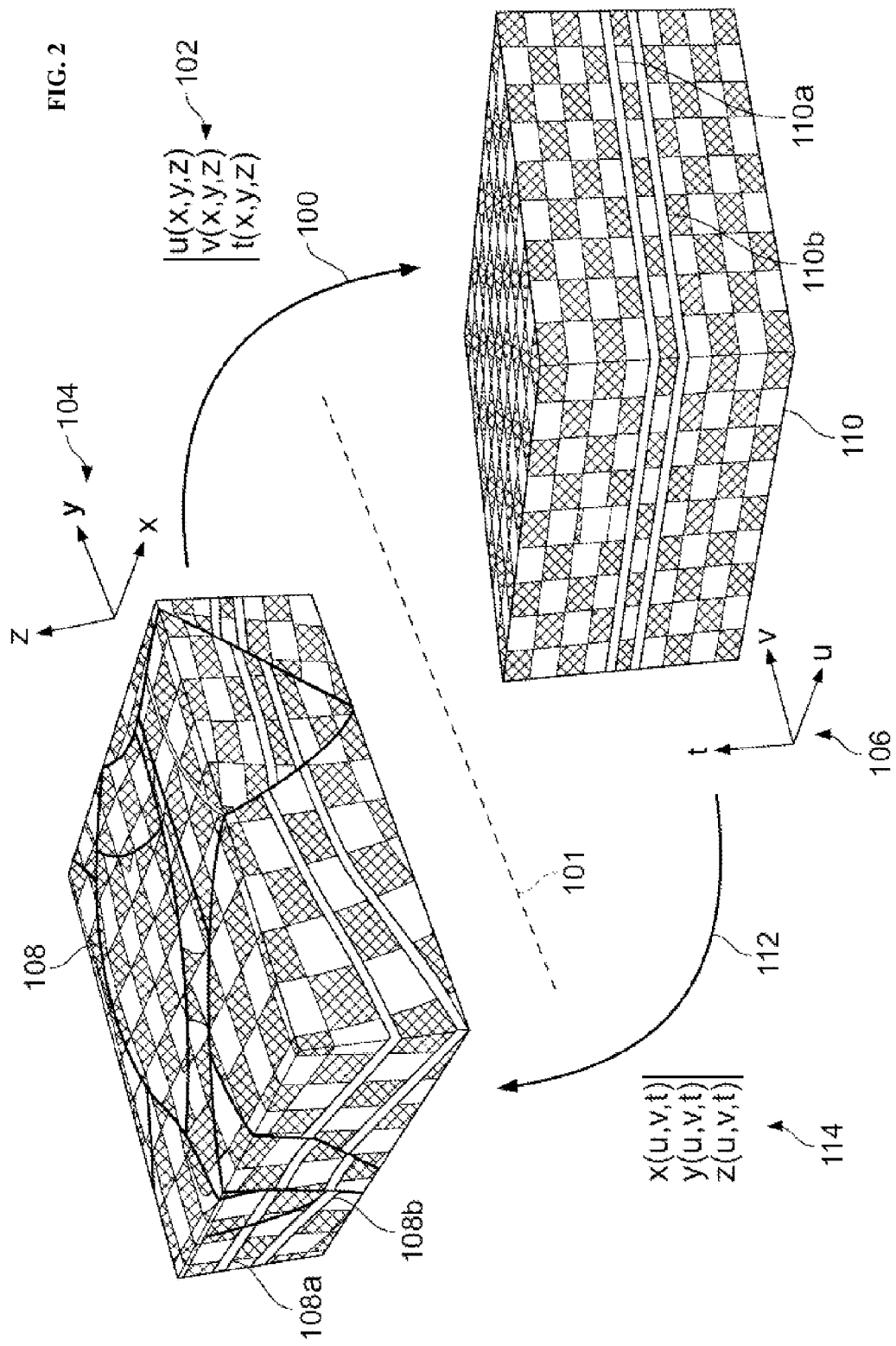
FIG. 2 is a schematic illustration of a transformation, map, parameterization or conversion between a current model in a present-day geological space and a depositional model in a predicted past geological space, according to some embodiments of the invention.

Reference is made to FIG. 2, which schematically illustrates a transformation, map or conversion between a current model 104 and an original depositional model 106 (separated by dashed line 101), according to some embodiments of the invention. Current model 104 may represent the current modeled locations of subsurface structures including particles of sediment in the terrain (typically at a granularity larger than that representing each particle). Current model 104 may be a 3D model in a Cartesian (x,y,z)-space, where the location of each particle is represented by the coordinates (x,y,z), where (x,y) may describe the geographical coordinates of the particle (e.g., latitude and longitude) and (z) may describe the altitude or distance below or above a surface level.

Depositional model 106 may represent estimated or predicted (past) locations of particles of sediment at the time when the particles were originally deposited, for example, in the layer. Depositional model 106 may be a 3D model in an (u,v,t)-space, where each particle may be represented by the coordinates (u,v,t) where (t) may be the geological-time of deposition of the particle and (u,v) may be the paleo-geographical coordinates of the particle at geological-time (t).

The "forward" or "direct" transformation 100 may be defined by functions 102 {u(x,y,z),v(x,y,z),t(x,y,z)}, which convert or transform each point (x,y,z) of current model 104 to a point {u(x,y,z),v(x,y,z),t(x,y,z)} of depositional model 106. The forward transformation 100 may be represented, for example, as follows:

$$(x, y, z) \xrightarrow{UVT} \{u(x, y, z), v(x, y, z), t(x, y, z)\} \quad [1]$$

The forward transformation or conversion 100 transforms each horizon H(t) (e.g., 108a or 108b) of current subsurface structure 108, in current model 104, into a level horizontal plane H*(t) (e.g., 110a and 110b, respectively) of depositional structure 110 in depositional model 106. In depositional model 106, horizons 110a and 110b of structure 110 are simply the images of the level surfaces of the function t(x,y,z) representing the geological-time at location (x,y,z). That is, since a horizon models a set of particles of sediment that was uniformly deposited in time, the geological-time of each horizon is constant at the time when the particles modeled thereby were originally deposited (e.g., in depositional model 106). Therefore, each horizon 110a and 110b in depositional model 106 may be planar and uniquely defined by a single geological-time, (t).

Conversely, the "inverse" or "reverse" conversion or transform 112 may be defined by functions 114 {x(u,v,t), y(u,v,t), z(u,v,t)}, which transform each point (u,v,t) of the depositional model 106 to a point {x(u,v,t), y(u,v,t), z(u,v,t)} in current model 104. The inverse transformation 112 may be represented, for example, as follows:

$$(u, v, t) \xrightarrow{UVT^{-1}} \{x(u, v, t), y(u, v, t), z(u, v, t)\} \quad [2]$$

Using the forward transform or conversion 100, e.g., defined in equation (1), and the inverse transform 112, e.g., defined in equation (2), any geological property may be modeled in one of the two models (current model 104 or depositional model 106) and the result of the property modeled in the one space may be transferred to the other space (depositional model 106 or current model 104, respectively). In practice, a geological property may be typically modeled in the space where modeling the property is the simplest. For example, horizons may be modeled in depositional model 106 where they have a simple flat planar form. Faults may be modeled first in current model 104 since they did not exist in the original depositional time, and may then be transformed to depositional space, to model their interaction with the planar horizons in depositional model 106.

Embodiments of the invention may manipulate data representations of real-world objects and entities such as underground geological structures, including faults, horizons and other features. Data received by for example a receiver receiving waves generated by an air gun or explosives may be manipulated and stored, e.g., in memory 150, and data such as images representing underground structures may be presented to a user, e.g., as a visualization on display 180 in FIG. 1.

Horizons, Faults and Unconformities

In stratified layers, horizons, faults and unconformities may be curvilinear (e.g., non-planar) surfaces which may be for example characterized as follows:

A horizon, H(t₀), may be a level surface of the geological time function t(x,y,z) corresponding to a plurality of particles of sediment which were deposited approximately at substantially the same geological-time (t₀).

A fault may be a surface of discontinuity of the horizons that may have been induced by a relative displacement of terrains on both sides of such surfaces. In other words, the geological-time t(x,y,z) of deposition of the sediments is discontinuous across each fault. Faults may cut horizons and may also cut other faults.

An unconformity may be a surface of discontinuity of the horizons that may have been induced by for example an erosion of old terrains replaced by new ones. In other words, similarly to faults, the geological-time function t(x,y,z) of deposition of the sediments is discontinuous across each unconformity. When discussed herein, unconformities are treated as faults: as a consequence, in this patent application, faults may include both real faults and unconformities. Alternately, unconformities may be surfaces bounding a sequence of sedimentary layers and one specific geological-time function t(x,y,z) may be assigned to each such sequence.

Notation

In accordance with the present invention and as used herein, the following notation is defined with the following meanings, unless explicitly stated otherwise:

(grad f) is a vector representing the gradient of a scalar function f, (a×b) represents the cross product of two vectors (a,b), (a·b) represents the dot product (also called the scalar product) of two vectors (a,b) and ∥a∥ represents the norm, magnitude, or absolute value of a vector (a).

(Bold notation generally represents multi-dimensional terms, such as, vectors.)

Paleo-Geographic Coordinates, IPG-Lines and N-Lines

Each particle of sediment observed today at geographical coordinates (x,y) and altitude (z) may have been deposited at paleo-geographical coordinates u(x,y,z), and v(x,y,z) which may differ from the current geographic coordinates (x,y). The GeoChron model may provide equations and algorithms allowing the geological-time function t(x,y,z) to be modeled at any location (x,y,z) in the subsurface.

For a pair of level surfaces $U(u_0)$ and $V(v_0)$ that are embedded in the 3D G-space:

$U(u_0)$ may include a plane of points representing particles of sediment which were deposited at substantially the same paleo-geographic coordinate ($u=u_0$). In other words, $U(u_0)$ is a level surface where the function u(x,y,z) is equal to the constant value $u_0$;

$V(u_0)$ may include a plane of points representing particles of sediment which were deposited at substantially the same paleo-geographic coordinate ($v=v_0$). In other words, $V(v_0)$ is a level surface where the function v(x,y,z) is equal to the constant value $v_0$;

The intersection of $U(u_0)$ and $V(v_0)$ may be called "Iso-Paleo-Geograhic-Lines" (IPG-lines) which is a line representing particles of sediments which have been deposited at the same paleo-geographic coordinates ($u_0,v_0$). The unit vector T(x,y,z) tangent to the IPG-line passing through location (x,y,z) in the G-space may be generated, for example, according to the following equation:

$$T(x,y,z) = (\text{grad } u(x,y,z) \times \text{grad } v(x,y,z))/\|\text{grad } u(x,y,z) \times \text{grad } v(x,y,z)\| \quad [3]$$

The geometry of the horizons and the IPG-lines may characterize the geometry of layers in the subsurface as observed today. Paleo-geographic coordinates (u,v) may be non-unique and may be rotated and translated to generate equivalent paleo-depositional coordinate systems in $\overline{G}$-space, illustrating that u-lines and v-lines may depend on the choice of paleo-geographic coordinates. In contrast, IPG-lines may have an intrinsic geological definition which may not depend on the choice of paleo-geographic coordinates (an IPG-line may be a subset of particles of sediment deposited at the same paleo-location, whatever the system of paleo-geographic coordinates). On the one hand, it may be common to use geometric properties of horizons (e.g., curvatures) as attributes. By definition, a horizon may be a set of particles of sediments which were deposited at the same geological time regardless of the paleo-geographic coordinates or system used. In the oil and gas industry, it may be common practice to compute the curvatures of an horizon and to use them as attributes. On the other hand, an IPG-line is a set of particles of sediment which were deposited at the same paleo-location whatever the system of paleo-geographic coordinates. Thus, it may be possible compute the curvature of such a line and use it as a new attribute.

A curve $NL(x_0,y_0,z_0)$ passing through the point ($x_0,y_0,z_0$) and constantly orthogonal to the horizons may be referred to as a "normal-line" also called an "N-line". The unit vector N(x,y,z) tangent to the N-line passing through location (x,y,z) in the G-space may be generated, for example, according to the following equation:

$$N(x,y,z) = \text{grad } t(x,y,z)/\|\text{grad } t(x,y,z)\| \quad [4]$$

Similar to what was described above for IPG-lines, it may be possible to compute the curvature of N-lines and use them as attributes. IPG-lines generally differ from N-lines, but both may be invariant under any equivalent transformation or parameterization.

Computing Derivatives

A 3D space S, where each point of this space is represented by three coordinates (X,Y,Z), may be defined by the GeoChron model as follows:

If (X,Y,Z) is identified with present-day coordinates (x,y,z), then the space S is identical to the G-space (e.g. current model 104 of FIG. 1).

If (X,Y,Z) is identified with paleo-coordinates (u,v,t), then the space S is identical to the $\overline{G}$-space (e.g. depositional model 106 of FIG. 1).

Embodiments of the invention may be used to numerically compute the partial derivatives of any functions F(X,Y,Z) at any location (X,Y,Z) of a 3D space S. For example, assuming that F(X,Y,Z) has been sampled at the nodes $(X_i,Y_j,Z_k)$ of a 3D regular rectilinear grid with hexahedral cells and steps $\Delta X$, $\Delta Y$ and $\Delta Z$ in the (X), (Y) and (Z) directions, a finite difference method or other method may be used to compute the partial derivatives of F(X,Y,Z) as follows:

$$dF(X_i,Y_j,Z_k)/dX = \{F(X_{i+1},Y_j,Z_k) - F(X_{i-1},Y_j,Z_k)\}/\{2\Delta X\}$$

$$dF(X_i,Y_j,Z_k)/dY = \{F(X_i,Y_{j+1},Z_k) - F(X_i,Y_{j-1},Z_k)\}/\{2\Delta Y\}$$

$$dF(X_i,Y_j,Z_k)/dZ = \{F(X_i,Y_j,Z_{k+1}) - F(X_i,Y_j,Z_{k-1})\}/\{2\Delta Z\}$$

A person of ordinary skill in the art may appreciate that these formulas may straightforwardly be generalized to numerically compute higher order derivatives with respect to X, Y, and Z.

Embodiments of the invention may also numerically compute derivatives of functions sampled at the nodes (also called vertices) of irregular grids such as, for example but not limited to, grids with tetrahedral cells and, more generally, polyhedral cells. After estimating derivatives at sampling locations $(X_i,Y_j,Z_k)$, local interpolations may then be used to numerically estimate these derivatives at any location within each cells.

These classical numerical methods may be used to numerically compute partial derivatives of any order. In particular, but not limited to, for any function F(X,Y,Z), these methods may be used to compute:

a gradient denoted "grad F" at each location (X,Y,Z), a Laplacian denoted "$\Delta F$" at each location (X,Y,Z), a directional derivative dF/ds of each function F(X,Y,Z) with respect to the arc length (s) in a given direction parallel to a unit vector D. Directional derivative dF/ds may be defined by the dot product of the gradient of F(X,Y,Z) by D, for example, as follows:

$$dF/ds = \text{grad } F(X,Y,Z) \cdot D$$

In the case where W(X,Y,Z) is a vector field, the partial derivatives of the components $W_X(X,Y,Z)$, $W_Y(X,Y,Z)$ and $W_Z(X,Y,Z)$ of W(X,Y,Z) may be numerically computed. In such a case, using these numerical derivation techniques, the divergence {div W(X,Y,Z)} of W(X,Y,Z) may also be computed, for example, as follows at each location (X,Y,Z):

$$\text{div } W(X,Y,Z) = dW_X/dX + dW_Y/dY + dW_Z/dZ$$

More generally, any scalar, vectorial or tensorial function involving derivatives of W(X,Y,Z) or its components may be computed.

Sedimentary Attributes

Based on the systems and methods described above, the functions u(x,y,z), v(x,y,z) and t(x,y,z) may be computed at any location (x,y,z) observed today in the subsurface. Each of these functions may be non-unique, variations of which may be considered as equivalent when the variations equivalently represent the same geometry and deformation of the geological layers, for example, when transformed to the current model observed today. For example, if u(x,y,z), v(x,y,z) and t(x,y,z) are equivalent to u*(x,y,z), v*(x,y,z) and t*(x,y,z), then:

- the horizons corresponding to the level set surfaces of the geological-time functions t(x,y,z) and t*(x,y,z) may have the same geometry, such as, thickness or curvature;
- the IPG-lines corresponding to the intersection of the level set surfaces of the paleo-geographic functions u(x,y,z) and v(x,y,z), respectively, may have the same geometry;
- the N-lines orthogonal to the horizons may have the same geometry; and/or
- the strain tensor or deformation calculated or deduced from the functions u(x,y,z), v(x,y,z) and t(x,y,z) may be identical to the strain tensor or deformation calculated or deduced from the functions u*(x,y,z), v*(x,y,z) and t*(x,y,z).

Sedimentary attributes may be represented by a function SA(x,y,z), which is determined, calculated or deduced using one or more of the functions u(x,y,z), v(x,y,z) and t(x,y,z). The function SA(x,y,z) may be further transformed or parameterized and described by the function SA(u,v,t)=SA(x(u,v,t),y(u,v,t),z(u,v,t)). For example, a sedimentary attribute may be based on sedimentation rate, as further explained below. The sedimentary attributes SA(x,y,z) may be derived or represented in G-space (e.g., describing sedimentary attributes of the current subsurface structure) and may be transformed to represent sedimentary attributes SA(u,v,t) in $\overline{G}$-space (e.g., describing sedimentary attributes of the subsurface structure at a time of original deposition).

In FIG. 2, the (u,v,t) space 106, a top horizon 110a and a bottom horizon 110b may bound a layer in the depositional model. These horizons 110a and 110b may be parallel horizontal surfaces forming a layer in $\overline{G}$-space 106 and may correspond to folded or faulted horizons 108a and 108b forming a layer in G-space 104. Folded or faulted horizons 108a and 108b may be parallel bounding a layer of laterally constant thickness or non-parallel bounding a layer of laterally varying thickness. One of these layers 302 is shown in G-space in FIG. 3A that has laterally varying thickness. In some embodiments, sedimentary attributes, such as, derivatives and other functions of sedimentation rate, may be determined based on the laterally variation in the thickness or the associated sedimentary rate of the layers 302. These sedimentary attributes may be visualized in present-day model 108 or past depositional model 110 or may be used to determine geometric properties of the models.

Figure 3A:
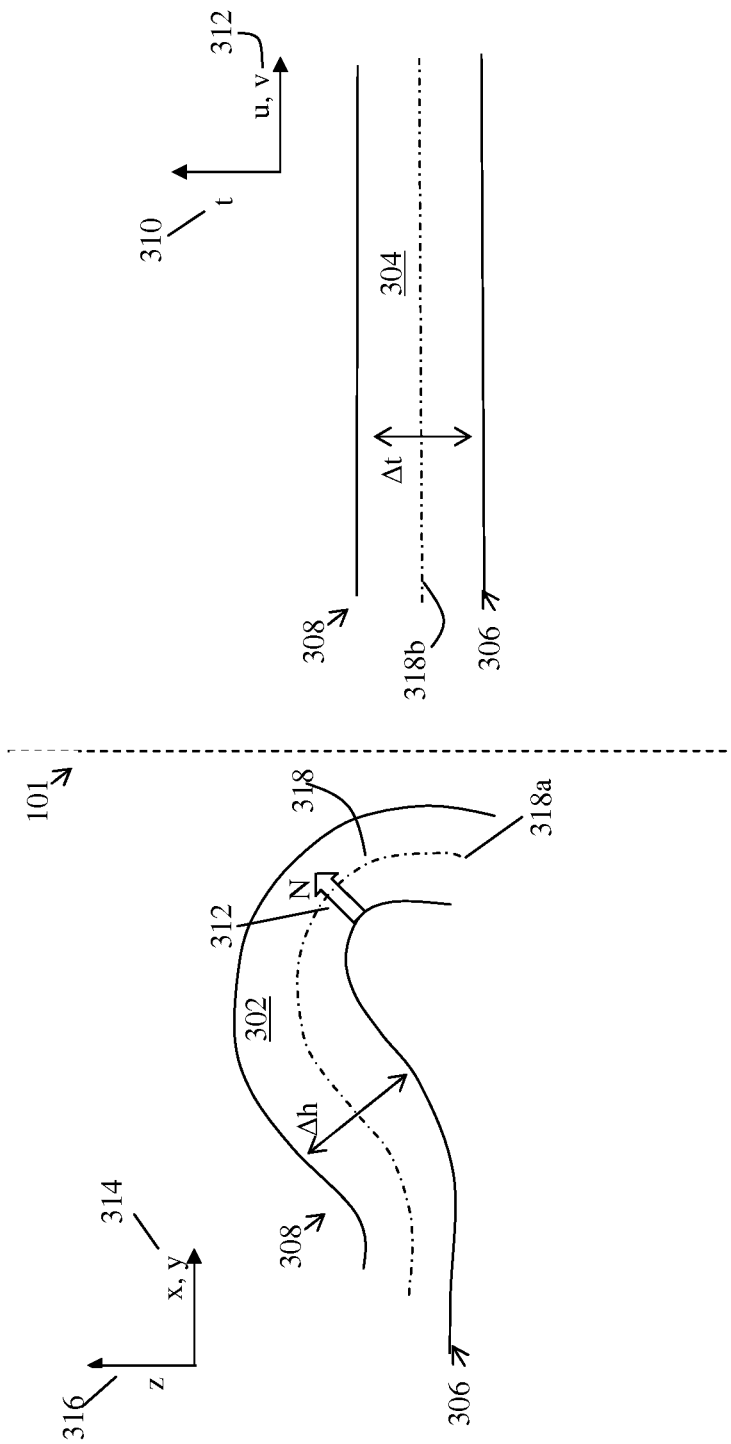
FIG. 3A is a schematic illustration of a vertical cross section of layers used to determine a sedimentation rate in the present-day geological space (left image) and the original depositional geological space (right image), according to embodiments of the invention.
Figure 3B:
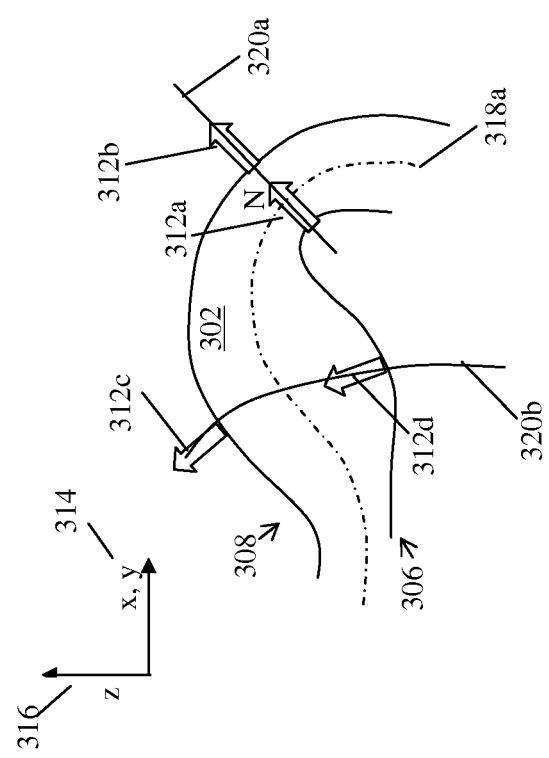
FIG. 3B is a schematic illustration of a vertical cross section of a layer in the present-day geological space used to determine a sedimentation rate based on N-lines or IPG-lines, according to embodiments of the invention.

Reference is made to FIG. 3A, which schematically illustrates a layer 302 in G-space and its image 304 in $\overline{G}$-space used to determine sedimentary attributes, according to embodiments of the invention. FIGS. 3A and 3B each show a 2D vertical cross-section of, but represent, a 3D model. Depending on the axes in which the cross-sections are taken, G-space may be represented by a (x,z) and/or (y,z) cross-section and $\overline{G}$-space may be represented by a (u,t) and/or (v,t) cross-section.

In FIG. 3A, layer 302 in G-space (e.g., representing a model of the current subsurface features observed in modern times or today) may be transformed to a layer 304 in $\overline{G}$-space (e.g. representing a depositional model). Layer 302 may have a thickness Δh bounded by a bottom horizon $H_t$ 306 and a top horizon $H_{t+\Delta t}$ 308, deposited at geological-times t and t+Δt, respectively. The thickness Δh of layer 302 may be non-constant, varying laterally along layer 302. As shown, layer 304 in $\overline{G}$-space has a constant (Δt) along each horizon, e.g. since the particles of each horizon are deposited at substantially the same geological time. In G-space, horizontal motion changes only in the (x,y) 314 plane, but not in the (z) axis 316. However, lateral motion along layer 302 changes not only in the (x,y) 314 plane but also along the (z) axis 316. Therefore, to determine lateral variations in sedimentation rate (e.g. to generate sedimentary attributes), embodiments of the invention may determine lateral variation in sedimentation rate (or thickness Δh) based on change (e.g. derivatives) of the sedimentation rate with respect to the paleo-geographic coordinates (u,v). The paleo-geographic coordinates vary along a surface 318 that follows the curvature of horizons bounding layer 302. Since layer 302 is folded, the shape of horizons 306 and 308 as well as intermediate surface 318a in G-space varies along all dimensions (x,y,z) of the present-day G-space. Since the curvilinear coordinates (u,v) in the G-space follow the curvature of a horizon 318a in the layer, it may be easier to determine lateral change or variation in the direction of the curvilinear (u,v) coordinates in $\overline{G}$-space, as shown by surface 318b. As with horizons 306 and 308, surface 318b may be an iso-t surface in which paleo-geographic coordinates (u,v) vary, but the geological-time of deposition (t) remains constant. Therefore, surface 318b may follow the curvature of horizons 306 and 308. Thus, the lateral change in sedimentation rate may be measured as a rate of lateral change within a layer, at a constant geological time, e.g., without crossing through different layers deposited at different geological times.

In a demonstrative example, a layer with constant thickness may be modeled to behave similarly to a book with a fixed number of pages bounded by a first page (e.g. representing horizon $H_t$ 306) and a last page (e.g. representing horizon $H_{t+\Delta t}$ 308). Whether the layer is folder or unfolded, its thickness may be the length of a segment orthogonal to $H_t$ 306 and $H_{t+\Delta t}$ 308 and may be equal to the sum of the thicknesses of the pages or layers. In other words, if there is substantially no compaction and the layers can slide on each other without generating gaps (e.g., like the pages of a book bending and sliding against each other without creating gaps) according to a "flexural slip" tectonic style of deformation, the thickness of the layers, Δh, may be invariant throughout geological-time in a curvilinear coordinate system (u,v,t). However, contrary to the pages of a book, the thickness of real geological layers may vary laterally with respect to (u,v,t). For example, layer 302 in FIG. 3A has a non-constant thickness.

When the thickness of layer 302 Δh becomes infinitely small, the gradient of the geological-time function t(x,y,z) at location (x,y,z) may be a vector of the G-space such that:

$$\text{grad } t(x,y,z) = (\Delta t(x,y,z)/\Delta h(x,y,z)) \cdot N(x,y,z) \quad [5]$$

where N(x,y,z) 312 may be the unit normal vector orthogonal to Ht at location (x,y,z) positively oriented in the direction of the younger terrains, e.g. as defined in equation (4). The sedimentation rate may be a scalar function V(x,y,z) at any location (x,y,z) in the geological space as observed today. The sedimentation rate may be equal or proportional to the speed or rate at which sediment is deposited on the Earth's surface throughout geological time. Accordingly, the sedimentation rate is proportional to the layer's thickness, Δh. The sedimentation rate may be defined for example as:

$$V(x,y,z) = \{1/\|\text{grad } t(x,y,z)\|\} = \text{limit } \Delta h/\Delta t \text{ when } \Delta t \text{ goes to zero} \quad [6]$$

This function represents an "apparent" or approximate sedimentation rate, and represents a "real" sedimentation rate for example when there is substantially no compaction and if the times of deposition assigned to the horizons are the actual or observed geological-times (e.g. experimentally verified with carbon dating or other techniques).

Embodiments of the invention may account for compaction of layers, which may be a process by which the porosity of a layer of sediment is decreased, or the compression or density of the sediment is increased, for example, as a result of its particles being squeezed together by the weight of overlying layers of sediment or by mechanical means. Layers of sediment that overlie or cover another layer may be layers deposited at a time later than the layers below (e.g., having a smaller z-value in (x,y,z)). A column of sediment h(x,y,z) orthogonal to the horizons observed today at location (x,y,z) in the G-space between two horizons $H_t$ and $H_{t+\Delta t}$ may have a compacted vertical thickness $\Delta h_C(x,y,z)$ at geological-time t of deposition such that:

$$\Delta h(x,y,z) = (1 - C(x,y,z)) \cdot \Delta h_C(x,y,z) \quad [7]$$

with: $0 < C(x,y,z) < 1$.

where the compaction function C(x,y,z) may be a compaction coefficient and may e.g. depend on the trajectory of the particles of sediment throughout geological-time and/or the nature of the sediment observed at location (x,y,z). The compaction function C(x,y,z) may vary laterally as different regions of the layer are more or less compacted. Based on equations (6) and (7), a sedimentation rate that takes compaction into account may be defined, for example, as:

$$V(x,y,z) = \{1/\|\text{grad } t(x,y,z)\|\}/\{1 - C(x,y,z)\} \quad [8]$$

A relatively high velocity of deposition (e.g., high sedimentation rate) at a point (x,y,z) may indicate a greater thickness of the layer surrounding that point.

Sedimentary Attributes Computed Based on the Lateral Variation in Sedimentation Rate The sedimentation rate V(x,y,z) may be used to determine or calculate sedimentary attributes that characterize the shape of the layers based on lateral variations of the sedimentation rate (e.g., as shown in FIG. 7, the lateral curvilinear directions u and v being tangent to the horizons). For example, throughout geological time, horizons may be impacted and shifted by tectonic forces and, as observed today, are now folded and faulted. From a geo-mechanical perspective, at any location or point (x,y,z) in the current geological G-space, these tectonic transformations may be characterized by strain or relative displacement of the particle (x,y,z). The strain at location (x,y,z) may be defined e.g. by a strain tensor E(x,y,z). The deformations may be modeled by a strain tensor E(x,y,z) and the directions of the potential fractures at that location (x,y,z) may be defined by the Eigen vectors of the strain tensor. The strain tensor may characterize the total deformations of the stack of horizons subjected to tectonic forces. A potential direction of fracture at location (x,y,z), characterized by strain tensor E(x,y,z) may indicate that if a fracture occurs at location (x,y,z), the direction of this fracture should be a function of the eigen vectors of E(x,y,z). In terms of the GeoChron model, at any location (x,y,z) in the G-space, the strain tensor E(x,y,z) may be a function of the paleo-geographic coordinates u(x,y,z) and v(x,y,z) in G-space space. Therefore, the directions of potential fractures E(x,y,z) may be indirectly controlled by the functions u(x,y,z) and v(x,y,z). Strain tensors may measure how far the stacked horizons differ from flat planes and how the horizons moved relatively to each other during tectonic events.

Attributes based on the lateral variation in sedimentation rate may include, for example, sedimentary expansion (FIG. 4), sedimentary potential (FIG. 5), and sedimentary acceleration (FIG. 6), as described below.

Sedimentary Expansion Attribute

The sedimentary expansion attribute may represent or describe variations in the flux or flow of geological materials (e.g., sediment) as they were deposited. Flux may generally describe the flow or movement of physical material through space. Deformations of horizons induced by lateral variations of layers thickness may also be viewed as sedimentary deformations related to variations of the flux of geological materials at depositional time and characterized by the "Ricci curvature tensor" which is a function of the second order derivatives of the sedimentary rate. Contrary to the mechanical strain tensor, the Ricci tensor may quantify how far the parallelism of horizons is impacted by the variations or changes of sedimentary fluxes and may not depend on tectonic forces. The Ricci scalar curvature KR may be the sum of all the eigen values of the Ricci curvature tensor and may be determined or calculated, for example, by partial derivatives of the sedimentation rate with respect to (u) and (v), as shown below.

$$KR(x,y,z) = -2\{d^2V(x,y,z)/du^2 + d^2V(x,y,z)/dv^2\}/V(x,y,z) \quad [9]$$

As equation (9) shows, this Ricci scalar curvature KR may be defined by variations (derivatives such as first or second order derivatives) in the lateral thickness of the layers in curvilinear directions (u,v) tangent to the horizons (e.g. along iso-t surface 700 in FIG. 7).

Similar to this Ricci scalar curvature KR(x,y,z), a sedimentary expansion rate THETA may be determined to locally characterize or describe the deformation induced by lateral variations of the sedimentation rate.

$$THETA(x,y,z) = -KR(x,y,z)/\text{constant} \quad [10]$$

where, e.g., constant is 30. The sedimentary expansion may measure a part of the dilatation of the terrains induced by the variations of the flux of geological materials along the horizons. This sedimentary expansion may be independent of the "mechanical dilatation" induced by tectonic forces associated to the "geo-mechanical" strain tensor E(x,y,z) explained above.

Figure 4:
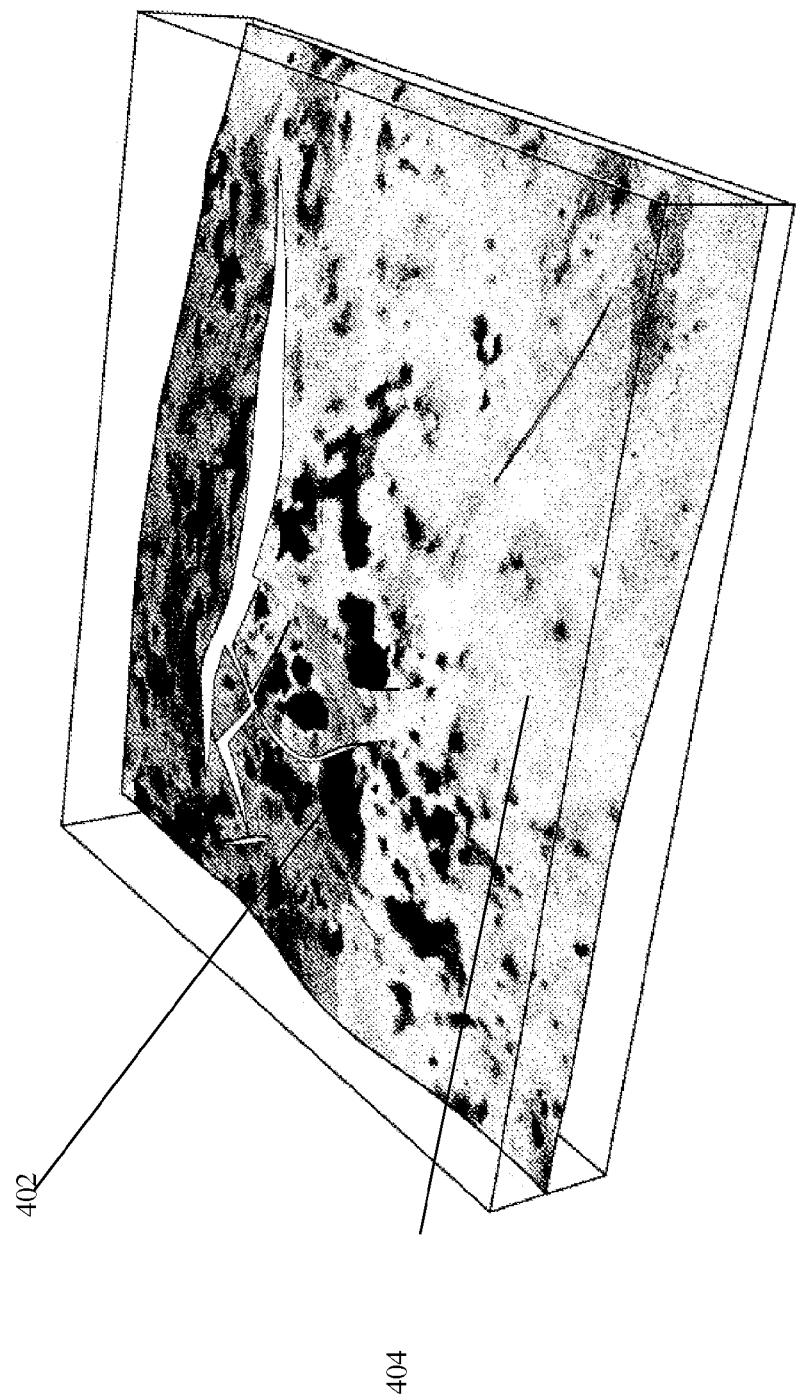
FIG. 4 is a schematic illustration of a model of sedimentary expansion attributes of a horizon, according to embodiments of the invention.

Reference is made to FIG. 4, which schematically illustrates a model of sedimentary expansion attribute THETA (x,y,z) of a horizon, according to embodiments of the invention. Darker areas 402 in FIG. 4 may correspond to dilatations in the subsurface and lighter areas 404 in FIG. 4 may correspond to contractions in the subsurface. In some embodiments, the sedimentary expansion attribute may be used to indicate the expansion of the thickness in the lateral direction e.g. tangential to the horizon. For example, in the oil and gas industry, that expansion may be correlated with the variation of the rock type and geo-physical properties.

Sedimentary Potential Attribute

Using the sedimentation rate V(x,y,z) and classical derivation rules, the Ricci scalar curvature described by equation (9) may also be equivalently expanded as follows:

$$-(1/2)KR(x,y,z) = d^2 \text{Log } \{V(x,y,z)\}/du^2 + d^2 \text{Log } \{V(x,y,z)\}/dv^2 + (d \text{ Log } \{V(x,y,z)\}/dv)^2 + (d \text{ Log } \{V(x,y,z)\}/dv)^2 \quad [11]$$

As equation (11) shows, Log $\{V(x,y,z,)\}$ may be used to determine the Ricci scalar curvature KR(x,y,z). Therefore, Log $\{V(x,y,z,)\}$ may be used to represent a sedimentary potential S(x,y,z)

$$S(x,y,z) = \text{Log } \{V(x,y,z)\} \quad [12]$$

Substituting Log {V(x,y,z)} with S(x,y,z), the Ricci scalar curvature defined by equation [9] or [11] may be rewritten as:

$$-(1/2)KR(x,y,z) = d^2S(x,y,z)/du^2 + d^2S(x,y,z)/dv^2 + \{dS(x,y,z)/dv\}^2 + dS(x,y,z)/dv)^2$$ [5]

A potential may be a scalar function, the gradient of which is used to define a vector field. As shown further below, a sedimentary acceleration A(x,y,z) may be a vector field related to the lateral variation in the sedimentation rate (and further, related to the lateral variation in the thickness of the layers) gradient of the sedimentary potential S(x,y,z). Due to this relationship between S(x,y,z) and A(x,y,z), both S(x,y,z) and A(x,y,a) may charachterize the sedimentation process. In some embodiments, for example, the sedimentary potential attribute may be correlated with rock types at a geological time when the particles were originally deposited.

Figure 5:
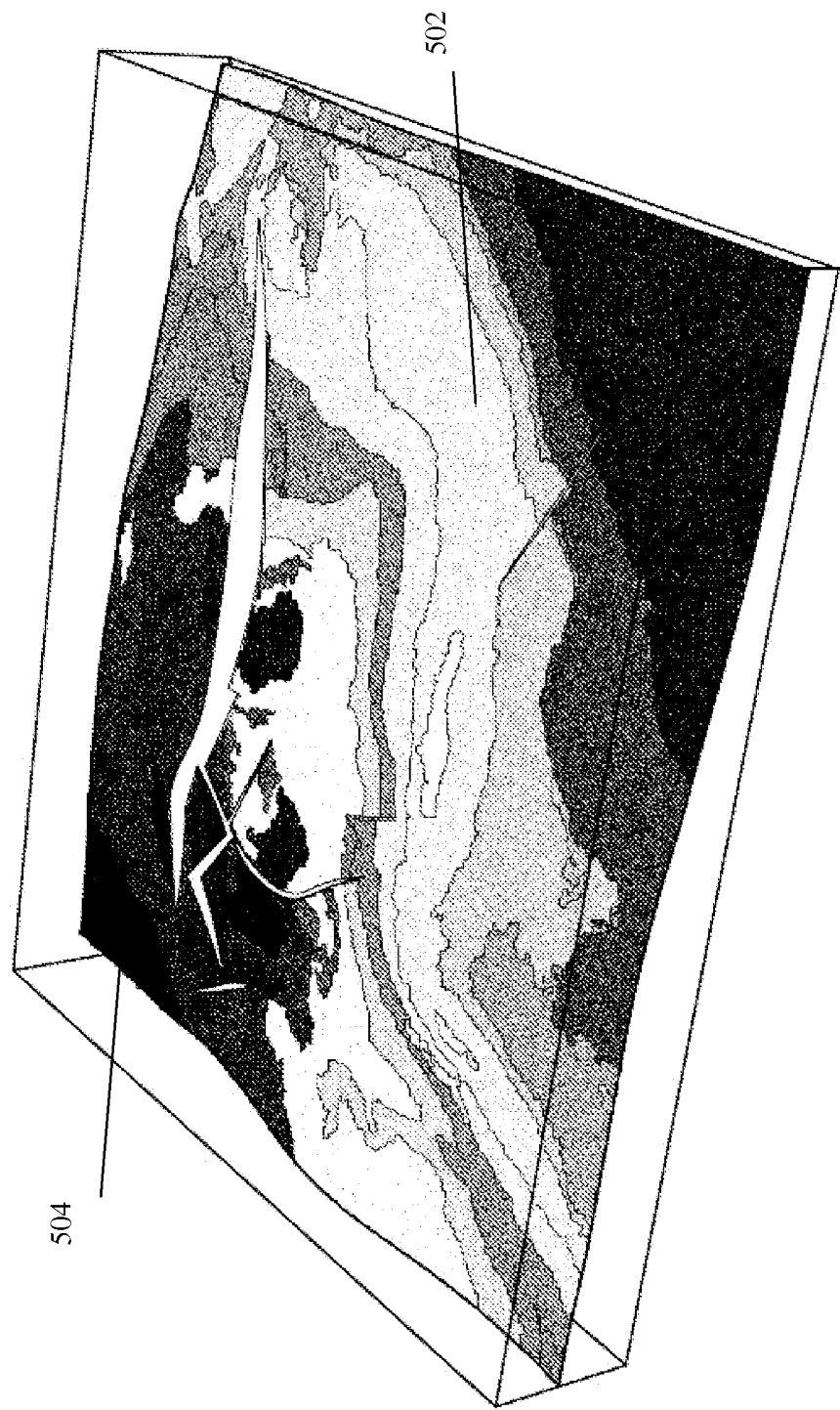
FIG. 5 is a schematic illustration of a model of sedimentary potential attributes of a horizon, according to embodiments of the invention.
Figure 6:
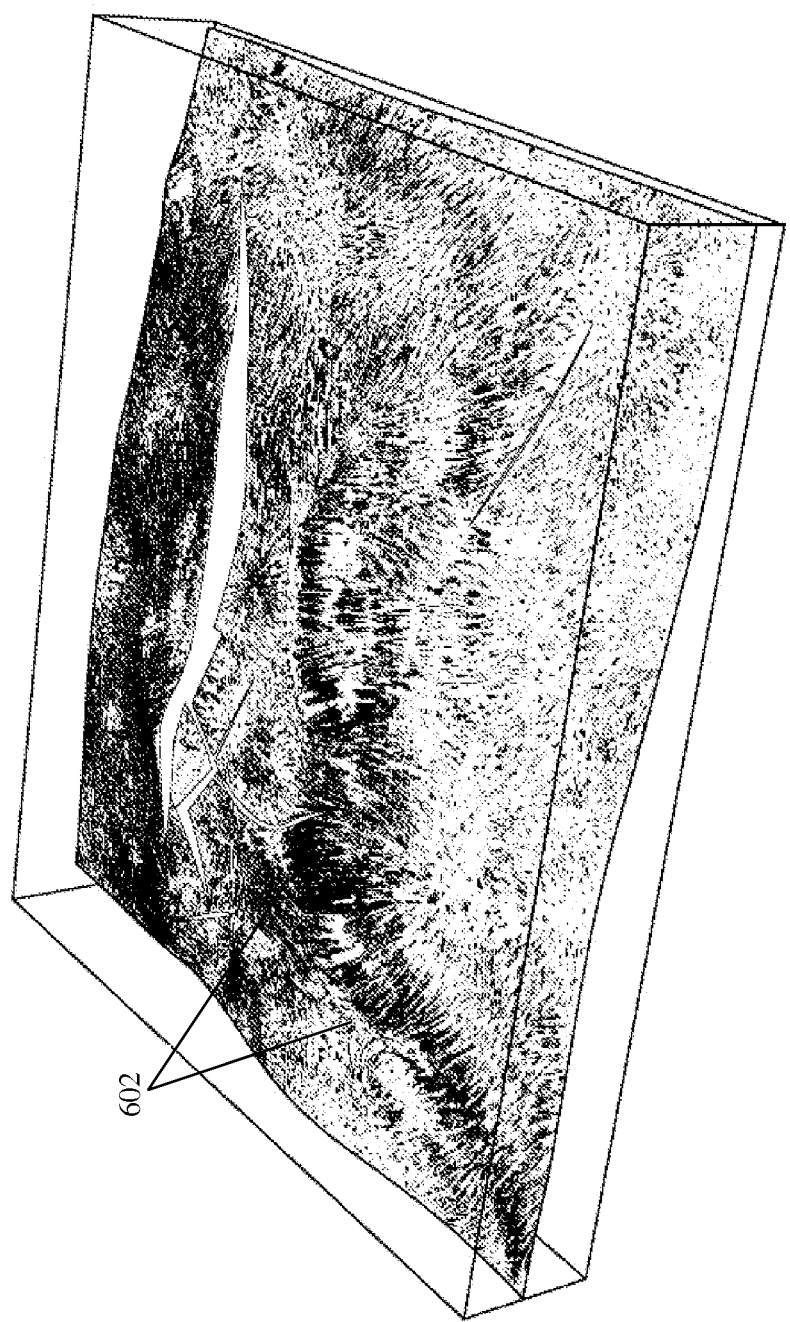
FIG. 6 is a schematic illustration of a model of sedimentary acceleration attributes of a horizon, according to embodiments of the invention.

Reference is made to FIG. 5, which schematically illustrates a model of sedimentary potential attribute S(x,y,z) of a horizon, according to embodiments of the invention. Some areas may be related to high potential areas 504 and other areas may be related to low potential areas 502.

Sedimentary Acceleration Attribute

The sedimentary acceleration attribute may be a vector field which is tangent to the horizons and which may have the property of canceling out at locations where the sedimentation rate is constant. The vector field may have a magnitude proportional to the rate of variation in the thickness of the layer and a direction oriented toward the direction of increasing layer thickness. For example, the larger the sedimentary acceleration vector, the faster the layers may thicken in the direction of the vector. The sedimentary acceleration vector field A(x,y,z) may be defined, for example, as the gradient of scalar function S(x,y,z) with respect to the (u,v) iso-t surface:

$$A(x,y,z) = \{dS(x,y,z)/du\} \cdot Ru(x,y,z) + \{dS(x,y,z)/dv\} \cdot Rv(x,y,z)$$ [13]

In this definition, Ru(x,y,z) and Rv(x,y,z) may be vector fields embedded in the G-space tangential to the horizon at location (x,y,z) and defined as follows:

$$Ru(x,y,z) = J(x,y,z) \cdot \{\text{grad } v(x,y,z) \times \text{grad } t(x,y,z)\}$$

$$Rv(x,y,z) = J(x,y,z) \cdot \{\text{grad } t(x,y,z) \times \text{grad } u(x,y,z)\}$$

The Jacobian function J(x,y,z) associated with the uvt-transform may be defined, for example, as follows:

$$J(x,y,z) = 1/[\{\text{grad } u(x,y,z) \times \text{grad } v(x,y,z)\} \cdot \text{grad } t(x,y,z)]$$ [14]

Reference is made to FIG. 6, which schematically illustrates a model of sedimentary acceleration attribute A(x,y,z) of a horizon, according to embodiments of the invention. As shown, attribute A(x,y,z) is a vector field 602 tangent to the horizons and oriented in the direction of increasing layer thickness. The magnitude of the vectors in 602 ||A(x,y,z)|| is proportional to the variation of the sedimentation rate V(x,y,z) in the direction of A(x,y,z). Thus, the larger ||A(x,y,z)|| is, the faster the layers thicken in direction A(x,y,z).

In some embodiments, the sedimentary acceleration attribute may be used to indicate which direction has the greater increase in thickness and therefore, the direction from where the sediments flowed at time of when the sediments in the layer were originally deposited. For example, in the oil and gas industry, that original direction may show a path followed by organic sediments, which generated the oil or gas. Therefore, these sedimentary attributes can be used by explorers to find oil or gas.

Additional Attributes

Other sedimentary attributes may be derived or determined based on the sedimentation rate or sedimentary acceleration. For example:

1. An expansion ratio Ep(x,y,z) may be defined as follows:

$$Ep(x,y,z) = J(x,y,z)/V(x,y,z)$$ [15]

The expansion ratio may be based on a cubic dilatation that describes the relationship between volume of a unit of sediment observed today and volume of the unit of sediment at a time that the sediment was originally deposited. The expansion ratio Ep(x,y,z) may be defined as the ratio of an infinitesimal element of volume of sediments dM(x,y,z) observed today and the same infinitesimal element of volume $dM_d(x,y,z)$ at depositional time.

$$Ep(x,y,z) = dM(x,y,z)/dM_d(x,y,z)$$

If the volume of a unit of sediment observed today is equal to the volume of a unit of sediment at depositional time, then the expansion ratio is equal to one. The ratio of $dM(x,y,z)/dM_d(x,y,z)$ may be the expansion ratio and may be approximated, for example, as J(x,y,z)/V(x,y,z), where J is the Jacobian function and V is the sedimentation rate.

2. A "sedimentary horizontal divergence" HD(x,y,z) of A(x,y,z) may be defined by:

$$HD(x, y, z) = div[A(x, y, z)]$$ [16]
$$= d^2 \text{Log} V(x, y, z)/du^2 + d^2 \text{Log} V(x, y, z)/dv^2$$
$$= d^2 S(x, y, z)/du^2 + d^2(x, y, z)/dv^2$$

3. A square of the "sedimentary horizontal norm" HN(x,y,z) of A(x,y,z) may be defined by:

$$HN^2(x,y,z) = \{dS(x,y,z)/du\}^2 + \{dS(x,y,z)/dv\}^2$$

which may be expanded to:

$$HN^2(x,y,z) = \{d \text{ Log } V(x,y,z)/du\}^2 + \{d \text{ Log } V(x,y,z)/dv\}^2$$ [17]

Reference is made to FIG. 3B, which schematically illustrates a vertical cross section of a layer 302 in the present-day geological space used to determine a sedimentation rate based on the geometry of N-lines 320a and b (or equivalently the geometry of IPG-lines), according to embodiments of the invention. In the following description, N-lines are discussed, although the same discussion relates to IPG-lines.

Sedimentary attributes may be determined based on the curvature of N-lines 320a and b, which may be correspond to the lateral variations of sedimentation rate V(x,y,z) along a layer. For example, if the sedimentation rate V(x,y,z) is constant laterally along layer 302 in a current geological time (G-space), sediment is deposited at the same rate along the layer and the layer will have the same thickness throughout. When layer 302 is folded or deformed over time, layer 302 becomes curved, but its thickness remains the same. Accordingly, the curvature of top horizon 306 approximately matches the curvature of the bottom horizon 308, only shifted vertically upwards (i.e. the top and bottom horizons are parallel). Because the top and bottom horizons 306, 308 are approximately parallel, e.g. as shown in the right-side segment of layer 302 in FIG. 3B, normal vectors 312a and 312b may be oriented substantially or approximately identically in the same direction. Thus, an N-line 320a (or IPG-line) connecting those normal vectors 312a and 312b (or IPG-vectors) may be defined by a straight N-line 320*a*. In one example (not shown), the top and bottom horizons bounding the layer in a current geological time may be parallel flat planes (e.g., parallel to the (x,y) plane). In this example, N-lines may be straight lines parallel to the z-axis 316. In another example (shown in FIG. 3B), the top and bottom horizons 306, 308 of layer 302 may be parallel, but curved instead of flat. In this example, N-line 320*a* of the top and bottom horizons may be a straight line connecting normal vectors 312*a* and 312*b* of the top and bottom horizons. Unlike the first instance, N-line 320*a* may not be parallel with the z-axis, but may nevertheless be a straight line. In contrast, when the sedimentary rates varies throughout layer 302 (e.g. as shown in the left-side by the bulging segment of the layer in FIG. 3B), the curvature of top and bottom horizons 306, 308 are not parallel, and their corresponding normal vectors 312*c* and 312*d* are oriented in different directions. Accordingly, an N-line 320*b* connecting those N-vectors will be curved. Thus, a curved N-line 320*b* may indicate that horizons 306, 308 bounding layer 302 are not parallel and that the thickness (and thus sedimentation rate) of layer 302 varies laterally along the layer (e.g. along surface 318*a*). The curvature of N-line 320*b* may therefore indicate the presence of lateral variations in the sedimentation rate along layer 302 (whereas a straight N-line having zero-curvature 320*a* may indicate a constant sedimentation rate along layer 302). Since the presence of lateral variations of sedimentation rate V(x,y,z) may be described by the curvatures of N-lines 320*a* and *b* (or similarly IPG-lines or other parameters computed from the curvature of N-lines and IPG-lines), these curvatures may be sedimentary attributes. Sedimentary attributes described by N-line or IPG-line curvatures may be defined, for example, as follows:

1. The IPG-line curvature vector field $k_{ipg}(x,y,z)$ may be defined as follows where (s) is the arc-length abscissa along the IPG-line passing through the point (x,y,z) and $T_{ipg}(x,y,z)$ is the unit vector tangent at this IPG-line at point (x,y,z):

$$k_{ipg}(x,y,z) = d\, T_{ipg}(x,y,z)/ds \quad [18]$$

In addition, the following functions may also be sedimentary attributes:
  a. the module $\|k_{ipg}(x,y,z)\|$
  b. the divergence $Dk_{ipg}(x,y,z) = \operatorname{div}\{k_{ipg}(x,y,z)\}$ 2. The N-line curvature vector field $k_n(x,y,z)$ may be defined as follows where (s) is the arc-length abscissa along the N-line passing through the point (x,y,z) and N(x,y,z) is the unit vector tangent at this N-line at point (x,y,z):

$$k_n(x,y,z) = d\, N(x,y,z)/ds \quad [19]$$

In addition, one can also consider the following functions as Sedimentary attributes:
  a. the module $\|k_r(x,y,z)\|$
  b. the divergence $Dk_n(x,y,z) = \operatorname{div}\{k_n(x,y,z)\}$ 3. The normal divergence ND(x,y,z) may be defined as the divergence of the field of unit normal vectors N(x,y,z) in the G-space.

Any particle of sediment observed today in the present-day G-space may be equivalently characterized by the three parameters (x,y,z) or the three parameters (u,v,t). As a consequence, using the uvt-transform described in FIG. 2, any sedimentary attribute SA(x,y,z) function of (x,y,z) may be also transformed or parameterized as a sedimentary attribute SA(u,v,t)=SA(u(x,y,z), v(x,y,z), t(x,y,z)) function of (u,v,t); conversely the reverse uvt-transformation or parameterization may apply. For example, the sedimentation rate defined by equation (6) or (8) may be uvt-transformed between xyz-space and uvt-space:

$$V(u,v,t) = V\{u(x,y,z), v(x,y,z), t(x,y,z)\} = V(x,y,z)$$

Whether a scalar, vectorial or tensorial function, a sedimentary attribute SA(x,y,z) may be visualized and displayed, e.g. as shown in FIGS. 4-6. Sedimentary attribute SA(x,y,z) may be displayed on a horizon H(t) corresponding to the set of particles of sediments which were approximately deposited at a common geological time (t). Alternately, sedimentary attribute SA(x,y,z) may be displayed on any cross section (iso-surface) of a model (e.g. iso-x, iso-y, iso-z, iso-u, iso-v, iso-t), or any other surface or volume. For example, the cross section may be a vertical cross-section or a horizon surface.

Reference is made to FIG. 7 illustrating iso-surfaces of a curvilinear coordinate system, according to embodiments of the invention. Embodiments of the invention may map a model of a layer bound or positioned between horizons (e.g., 306 and 308 in FIG. 3A or 108*a* and 108*b* in FIG. 2) from a non-curvilinear first (x,y,z) coordinate system to a curvilinear second (u,v,t) coordinate system 704. The non-curvilinear coordinate system may be rectilinear, for example, and may include axes that are mutually perpendicular, such as in the Cartesian coordinate system. In contrast, the axes of the curvilinear coordinate system are not mutually perpendicular, but curve, as they monotonically increase (e.g., excluding spherical or other periodically repeating coordinates systems). A sedimentation rate may be determined that varies laterally along the layer. One or more sedimentary attributes based on the lateral variation of the sedimentation rate within the layer may be determined by approximating the change in the sedimentation rate along one or more iso-t surfaces 700 of the curvilinear second coordinate system 704. Iso-u 706, iso-v 702 and iso-t 700 surfaces may be surfaces having a single (iso) value (u), (v), and (t), respectively, and the remaining coordinates vary. For example, iso-t surface 700 may have a single (t) value, but a range or all (u) and (v) values. Iso-t surface 700 may define the lateral direction following the curvature of a sedimentary layer along which sedimentary attributes are computed. The sedimentary attributes may be displayed in a model in the curvilinear coordinate system 704 or non-curvilinear coordinate system (e.g., 106 in FIG. 2).

Figure 8:
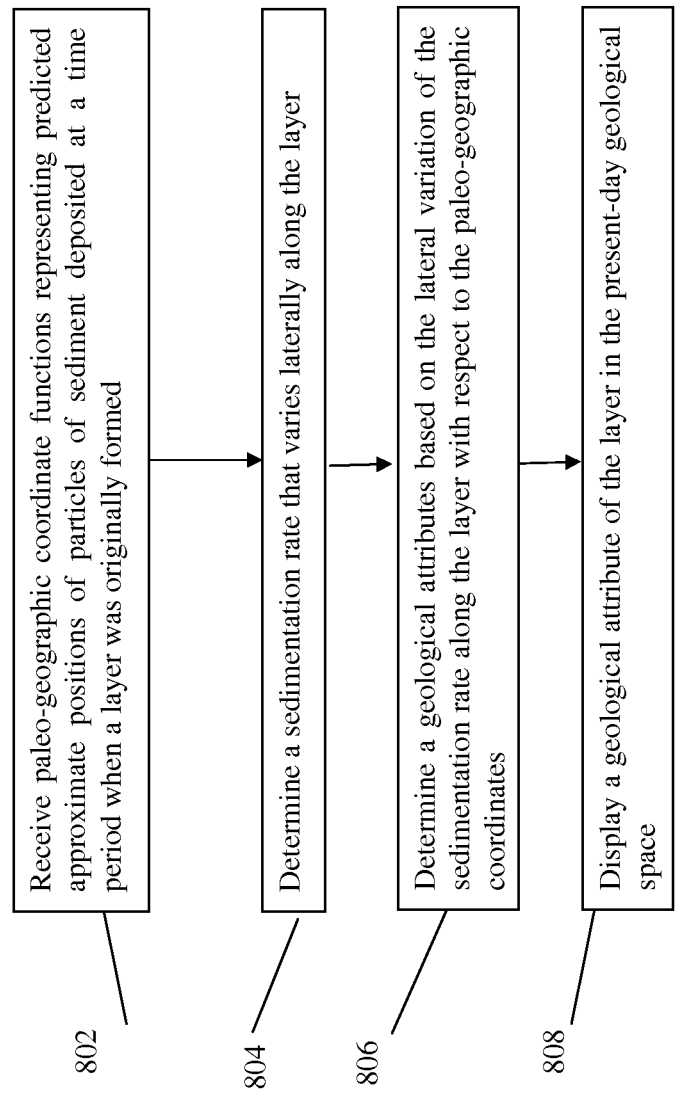
FIG. 8 is a flowchart of a method, according to embodiments of the invention.

FIG. 8 is a flowchart of method, according to embodiments of the invention.

In operation 802, a receiver or processor may receive paleo-geographic coordinate functions representing predicted approximate positions of particles of sediment deposited at a time period when a layer was originally formed. The paleo-geographic coordinate functions may be characterized by u(x,y,z), v(x,y,z) and/or t(x,y,z).

In operation 804, a processor (e.g., 140 of FIG. 1) may determine a sedimentation rate that varies laterally along the layer. The sedimentation rate may be a scalar function that is proportional to the speed or rate at which sediment is deposited on the Earth's surface.

In operation 806, a processor may determine a sedimentary attribute based on the lateral variation of the sedimentation rate along the layer with respect to paleo-geographic coordinates (e.g. along an iso-t surface). The lateral variation may depend on derivatives of the sedimentation rate with respect to the paleo-geographic coordinates (u) and (v). The sedimentary attributes may include sedimentary acceleration or sedimentary expansion, for example.

In operation 808, a display unit (e.g., 180 of FIG. 1) may display a sedimentary attribute of the layer in the present-day geological space or depositional space. Attributes may be transformed back and forth between the two spaces.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein. Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method to visualize sedimentary attributes that represent properties of a sedimentation process of particles of a geological layer during deposition, the method comprising:
    in a computer processor:
        receiving measured geological data representing a present-day configuration of the geological layer in present-day geological coordinates;
        transforming the geological data to paleo-geographic coordinates representing predicted approximate positions of particles of sediment deposited at a time period when the geological layer was originally formed;
        determining a sedimentation rate that varies laterally along the geological layer;
        determining a sedimentary attribute as a function of a variation of the sedimentation rate with respect to the paleo-geographic coordinates; and
        displaying the geological layer and the sedimentary attribute representing the sedimentation of particles of sediment within the geological layer with respect to the present-day geological coordinates.

2. The method of claim 1, wherein the sedimentary attribute includes sedimentary expansion, which represents variations in a flux of sediment being deposited.

3. The method of claim 1, wherein the sedimentary attribute is sedimentary potential, wherein the gradient of the sedimentary potential represents a vector field related to a lateral variation in the geological layer's thickness.

4. The method of claim 1, wherein the sedimentary attribute is sedimentary acceleration, wherein the sedimentary acceleration has a magnitude proportional to the rate of variation in the thickness of the geological layer and a direction oriented toward the direction of increasing layer thickness.

5. The method of claim 1, wherein the sedimentary attribute is selected from a group consisting of: sedimentary acceleration, sedimentary expansion, sedimentary potential, sedimentary expansion ratio, sedimentary horizontal divergence, sedimentary horizontal norm, curvature of an IPG-line, curvature of an N-line and normal divergence.

6. The method of claim 1, wherein the paleo-geographic coordinates vary along a surface that follows the curvature of horizons bounding the geological layer.

7. The method of claim 1, wherein the variation of the sedimentation rate depends on derivatives of the sedimentation rate with respect to the paleo-geographic coordinates.

8. The method of claim 1, wherein the sedimentation rate accounts for a compaction of sediment describing a decrease in porosity due to a weight of overlying layers of sediment.

9. The method of claim 1, comprising transforming a function of the sedimentary attribute in the present-day geological space to a function of the sedimentary attribute at a time period when the geological layer was originally formed.

10. The method of claim 1, comprising transforming a function of the sedimentary attribute at a time period when the geological layer was originally formed to a function of the sedimentary attribute in the present-day geological space.

11. The method of claim 1, wherein the sedimentary attribute is sedimentary potential, wherein the sedimentary potential depends on a logarithm of the sedimentation rate.

12. A system for visualizing sedimentary attributes that represent properties of a sedimentation process of particles of a geological layer during deposition, the system comprising:
    a memory to store a set of paleo-geographic coordinates;
    a computer processor configured to:
        receive measured geological data representing a present-day configuration of the geological layer in present-day geological coordinates;
        transform the geological data to paleo-geographic coordinate functions representing predicted approximate positions of particles of sediment deposited at a time period when a layer was originally formed,
        determine a sedimentation rate that varies laterally along the geological layer, and
        determine a sedimentary attribute as a function of a variation of the sedimentation rate with respect to the paleo-geographic coordinates; and
    a display for displaying the geological layer and the sedimentary attribute representing the sedimentation of particles of sediment within the geological layer with respect to the present-day geological coordinates.

13. The system of claim 12, wherein the sedimentary attribute is sedimentary expansion, which represents variations in a flux of sediment being deposited.

14. The system of claim 12, wherein the sedimentary attribute is sedimentary potential, wherein the gradient of the sedimentary potential represents a vector field related to a lateral variation in the geological layer's thickness.

15. The system of claim 12, wherein the sedimentary attribute is sedimentary acceleration, which represents the acceleration with which the particles of sediment were deposited.

16. The system of claim 12, wherein the processor is to transform a function of the sedimentary attribute in the present-day geological space to a function of the sedimentary attribute at a time period when the geological layer was originally formed.

* * * * *